US007713429B2

(12) United States Patent
Yokouchi

(10) Patent No.: US 7,713,429 B2
(45) Date of Patent: May 11, 2010

(54) METHOD OF MANUFACTURING NOZZLE PLATE, AND LIQUID EJECTION HEAD AND IMAGE FORMING APPARATUS COMPRISING NOZZLE PLATE

(75) Inventor: Tsutomu Yokouchi, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 911 days.

(21) Appl. No.: 11/341,634

(22) Filed: Jan. 30, 2006

(65) Prior Publication Data

US 2006/0170747 A1 Aug. 3, 2006

(30) Foreign Application Priority Data

Jan. 31, 2005 (JP) ............................ 2005-024126

(51) Int. Cl.
*G01D 15/00* (2006.01)

(52) U.S. Cl. .......................... 216/27; 216/95; 427/154; 427/155; 427/156; 427/282; 427/300

(58) Field of Classification Search .................. 216/27, 216/95; 427/154–156, 282, 300
See application file for complete search history.

(56) References Cited

U.S. PATENT DOCUMENTS

| | | | | |
|---|---|---|---|---|
| 4,234,675 | A * | 11/1980 | Kuznetsov | 430/271.1 |
| 5,312,517 | A * | 5/1994 | Ouki | 216/27 |
| 5,863,371 | A * | 1/1999 | Takemoto et al. | 156/273.3 |
| 6,341,836 | B1 * | 1/2002 | Koike et al. | 347/20 |
| 6,846,068 | B2 * | 1/2005 | Kim | 347/64 |
| 6,872,634 | B2 * | 3/2005 | Koizumi et al. | 438/460 |

FOREIGN PATENT DOCUMENTS

| | | | |
|---|---|---|---|
| JP | 8-309997 | A | 11/1996 |
| JP | 9-76492 | A | 3/1997 |
| JP | 2000-108359 | A | 4/2000 |

* cited by examiner

*Primary Examiner*—Michael Cleveland
*Assistant Examiner*—Alex Rolland
(74) *Attorney, Agent, or Firm*—Birch, Stewart, Kolasch & Birch, LLP

(57) ABSTRACT

The method of manufacturing a nozzle plate comprises the steps of: applying a protective sheet to a first surface of a nozzle plate in which nozzles are to be formed; forming holes which pass through the nozzle plate and have bottoms inside the protective sheet, from a side of a second surface of the nozzle plate reverse to the first surface; filling a filling material into the holes, from the side of the second surface; peeling away the protective sheet after the filling step; forming a liquid-repelling film on the first surface of the nozzle plate after the peeling step; and removing the filling material after the liquid-repelling film forming step.

22 Claims, 13 Drawing Sheets

METHOD OF MANUFACTURING NOZZLE PLATE, AND LIQUID EJECTION HEAD AND IMAGE FORMING APPARATUS COMPRISING NOZZLE PLATE

BACKGROUND OF THE INVENTION

1. Field of the Invention

The present invention relates to a method of manufacturing a nozzle plate, and a liquid ejection head and an image forming apparatus comprising the nozzle plate, and more particularly, to technology for forming a liquid-repelling film onto the surface of a nozzle plate in which a plurality of microscopic liquid ejection ports (nozzles) for ejecting liquid are formed, and to a liquid ejection head and an image forming apparatus using this nozzle plate.

2. Description of the Related Art

An inkjet recording apparatus or inkjet printer is known as an image forming apparatus. The inkjet printer comprises an inkjet head (liquid ejection head) having an arrangement of a plurality of nozzles (ejection ports) for ejecting ink (liquid), and forms images on a recording medium by ejecting droplets of the ink from the nozzles while causing the inkjet head and the recording medium to move relatively to each other.

Various methods are known as ink ejection methods for an inkjet recording apparatus. For example, a piezoelectric method is known, in which a diaphragm which constitutes a portion of a pressure chamber is deformed by the deformation of a piezoelectric element, thereby changing the volume of the pressure chamber, ink is introduced into the pressure chamber from an ink supply passage when the volume of a pressure chamber is increased, and the ink inside the pressure chamber is ejected from the nozzle in the form of ink droplet when the volume of the pressure chamber is decreased.

In an inkjet recording apparatus of this kind, if a liquid-repelling or ink-repelling treatment is not provided on the surface of the nozzle plate in which the nozzles of the inkjet head are formed, then ejection abnormalities, such as bending of the direction of flight of the ink droplets ejected from the nozzles may occur, due to ink adhering to the periphery of the nozzles on the surface of the nozzle plate.

On the other hand, if a liquid-repelling film is formed on the surface of the nozzle plate, then soiling around the periphery of the nozzles can be removed more readily, leakage of ink from the nozzles is reduced, and the direction of ejection of the ink and the ink ejection volume can be stabilized. However, in this case, if the formation of the liquid-repelling film is not uniform in the periphery of the nozzles on the surface of the nozzle plate, then ejection abnormalities such as bending of the flight will still occur.

Various methods have been proposed for forming a liquid-repelling film uniformly to a high degree of accuracy at the periphery of the nozzles on the surface of the nozzle plate. One method for forming a liquid-repelling film uniformly at the periphery of the nozzles is a method which forms a liquid-repelling film by introducing a filling material into the nozzles before forming the liquid-repelling film on the surface of the nozzle plate, in such a manner that the liquid-repelling film does not enter into the nozzles. In this case, there is a method which bonds a sheet (covering material) that covers the nozzle apertures onto the surface of the nozzle plate when the filling material is introduced, and a method which does not bond such a sheet.

For example, Japanese Patent Application Publication No. 8-309997 discloses a liquid-repelling film forming method in which the sheet is bonded. In the method, the whole surface of the nozzle plate (the ink ejection face) formed with nozzle apertures is covered with a dry film resist at first, ultraviolet light is then irradiated from the rear face of the nozzle plate, in such a manner that only the portions of the dry film resist covering the nozzle apertures become insoluble with respect to a developer, whereupon a filling material is introduced from the rear face of the nozzle plate, and the rear face of the nozzle plate and the interior of the nozzle apertures are covered with the filling material. Thereupon, the dry film resist is developed, the portion of the dry film resist on the surface of the nozzle plate other than the portions covering the nozzle apertures are removed, a liquid-repelling film is formed on the portion of the surface of the nozzle plate other than the regions of the nozzle apertures, and finally, the dry film resist remaining on the regions of the nozzle apertures is removed along with all of the filling material, thereby yielding a nozzle plate in which the liquid-repelling film is formed on the surface of the nozzle plate apart from over the nozzle apertures.

Japanese Patent Application Publication No. 9-76492 discloses a liquid-repelling film forming method in which no sheet is bonded. In the method, a dry film resist is filled into nozzle apertures formed in a nozzle plate, the surface of the nozzle aperture sections on the nozzle plate is cut away by etching, and the dry film resist of the nozzle aperture sections is caused to project at the surface of the nozzle aperture sections. A surface treatment layer (liquid-repelling film) is then formed on the surface of the nozzle aperture sections other than the nozzle apertures, and the dry film resist is removed, thereby yielding a nozzle plate formed with a liquid-repelling film on the surface other than the nozzle apertures.

Japanese Patent Application Publication No. 2000-108359 discloses a liquid-repelling film forming method in which the sheet is bonded. In the method, a transparent masking sheet is bonded as a covering material onto the surface of a nozzle plate in which nozzles are formed (the surface on the side of the nozzle aperture sections), and a filling material or an ultraviolet-curable adhesive having properties of repelling an ink-repelling resin film solution is filled from the opposite side. The ultraviolet-curable adhesive is cured by irradiating ultraviolet light from both sides, and the masking sheet on the nozzle surface is removed. Then, an ink-repelling resin film solution is applied onto the nozzle surface, dried and heated, thereby forming an ink-repelling resin film. Finally, the ultraviolet-curable adhesive filled in the nozzles is removed, thereby yielding a nozzle plate formed with an ink-repelling film on the nozzle surface thereof.

However, if a filling material for preventing liquid-repelling film from entering into the nozzle apertures is filled into the nozzles, then in the case of a method where no sheet is bonded onto the nozzle surface of the nozzle plate, the filling material projects from the nozzles, and it can be expected that this projection will not be uniform, and hence the liquid-repelling film will not be uniform, either. For example, in the method described in Japanese Patent Application Publication No. 9-76492, if the dry film resist is made to project from the nozzle apertures by cutting the surface of the nozzle plate, then there is a loss of homogeneity within the plane of the surface of the nozzle plate, and the subsequently formed liquid-repelling film will have variations between the respective nozzles.

Moreover, in a method where a sheet is bonded onto the nozzle surface when the filling material is filled into the nozzles, when the filling material is introduced into the nozzles, gas remains inside the nozzles, giving rise to uneven filling of the filling material, and hence it is expected that the liquid-repelling film will also lack uniformity. For example, in the methods described in Japanese Patent Application Publication Nos. 8-309997 and 2000-108359, uniform filling is not achieved when the filling material is introduced into the nozzles, and hence the liquid-repelling film is not uniform. Furthermore, in the case of Japanese Patent Application Publication No. 8-309997, in particular, a step of developing the dry film resist is required, and hence the process is troublesome.

SUMMARY OF THE INVENTION

The present invention has been contrived in view of the foregoing circumstances, an object thereof being to provide a method of manufacturing a nozzle plate, and a liquid ejection head and an image forming apparatus comprising same, whereby a liquid-repelling film can be formed uniformly to a high degree of accuracy about the periphery of the nozzles.

In order to attain the aforementioned object, the present invention is directed to a method of manufacturing a nozzle plate, comprising the steps of: applying a protective sheet to a first surface of a nozzle plate in which nozzles are to be formed; forming holes which pass through the nozzle plate and have bottoms inside the protective sheet, from a side of a second surface of the nozzle plate reverse to the first surface; filling a filling material into the holes, from the side of the second surface; peeling away the protective sheet after the filling step; forming a liquid-repelling film on the first surface of the nozzle plate after the peeling step; and removing the filling material after the liquid-repelling film forming step.

According to the present invention, by processing the nozzle plate and the protective sheet simultaneously, it is possible to process the holes (bottomed holes) of the same diameter as the nozzles in the protective sheet, while reducing the hole processing work, and the filling material can be introduced sufficiently so as to reach the protective sheet, thereby making it possible to form the liquid-repelling film uniformly at the periphery of the nozzles.

Preferably, the bottoms of the holes are formed thin so as to enable a filling state of the filling material during the filling step to be observed through the bottoms from a side of a surface of the protective sheet reverse to a surface applied to the nozzle plate; and the filling material is filled while the filling state is observed in the filling step.

According to the present invention, when filling the filling material, it is possible to confirm the state of filling, and hence satisfactory filling can be achieved and the occurrence of non-uniformities in the liquid-repelling film due to insufficient filling can be prevented.

Preferably, the holes are formed by one of dry etching and laser processing. Accordingly, in the case of dry etching, the whole surface are be processed simultaneously, and processing accuracy is good, while in the case of laser processing, a large surface area can be processed, and it is possible to harmonize the hole diameters in the nozzle plate and the liquid-repelling film, thereby preventing the occurrence of step differences between the nozzle plate and the liquid-repelling film.

Preferably, the method further comprises the step of washing insides of the holes before the filling step. Accordingly, it is possible to avoid filling defects of the filling material, and non-uniform formation of the liquid-repelling film resulting from same.

Preferably, the protective sheet loses adhesive force when heated or irradiated with light, and the protective sheet is peeled away after being made to lose its adhesive force. Accordingly, it is possible to prevent the deformation of the nozzle plate due to the application of a large stress to same when the protective sheet is peeled away from the nozzle plate.

In order to attain the aforementioned object, the present invention is also directed to a liquid ejection head having the nozzle plate manufactured by the above-described method.

In order to attain the aforementioned object, the present invention is also directed to an image forming apparatus comprising the above-described liquid ejection head.

Accordingly, it is possible to form an image to a high accuracy by means of a liquid ejection head having a nozzle plate on which a liquid-repelling film is formed uniformly in the periphery of the nozzles.

In order to attain the aforementioned object, the present invention is also directed to a method of manufacturing a nozzle plate, comprising the steps of: applying a protective sheet to a first surface of a nozzle plate in which nozzles have been formed; forming holes which are continuous with the nozzles and have bottoms inside the protective sheet, from a side of a second surface of the nozzle plate reverse to the first surface; filling a filling material into the holes, from the side of the second surface; peeling away the protective sheet after the filling step; forming a liquid-repelling film on the first surface of the nozzle plate after the peeling step; and removing the filling material after the liquid-repelling film forming step.

According to the present invention, by using the nozzle plate itself as the mask when forming holes in the protective sheet, it becomes unnecessary to perform a resist developing step, and furthermore, the holes of the same diameter as the nozzles can be formed readily, the filling material can be introduced sufficiently until reaching the protective sheet, and the liquid-repelling film can be formed uniformly at the periphery of the nozzles.

In order to attain the aforementioned object, the present invention is also directed to a method of manufacturing a nozzle plate, comprising the steps of: applying a protective sheet to a first surface of a nozzle plate in which nozzles are to be formed; forming holes which pass through the nozzle plate and the protective sheet, from a side of a second surface of the nozzle plate reverse to the first surface; filling a filling material into the holes until the filling material reaches a part of the protective sheet in each of the holes, from the side of the second surface; peeling away the protective sheet after the filling step; forming a liquid-repelling film on the first surface of the nozzle plate after the peeling step; and removing the filling material after the liquid-repelling film forming step.

According to the present invention, when filling the filling material, it is possible to confirm the state of filling, and hence satisfactory filling can be achieved and the occurrence of non-uniformities in the liquid-repelling film due to insufficient filling can be prevented.

In order to attain the aforementioned object, the present invention is also directed to a method of manufacturing a nozzle plate, comprising the steps of: applying a protective sheet to a first surface of a nozzle plate in which nozzles have been formed; forming holes which are continuous with the nozzles and pass through the protective sheet, from a side of a second surface of the nozzle plate reverse to the first surface; filling a filling material into the holes until the filling material reaches a part of the protective sheet in each of the holes, from the side of the second surface; peeling away the protective sheet after the filling step; forming a liquid-repelling film on the first surface of the nozzle plate after the peeling step; and removing the filling material after the liquid-repelling film forming step.

According to the present invention, by using the nozzle plate itself as the mask when forming the holes, it becomes unnecessary to perform a resist developing step, and furthermore, when filling the filling material, the state of filling can be confirmed, sufficient filling can be achieved, and the occurrence of non-uniformities in the liquid-repelling film due to insufficient filling can be prevented.

As described above, according to the present invention, it is possible to process holes (bottomed holes) of the same diameter as the nozzles, in the protective sheet, and to introduce a filling material sufficiently into the holes until reaching the protective sheet, and hence the liquid-repelling film can be formed uniformly in the periphery of the nozzles.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENTS

Figure 1:
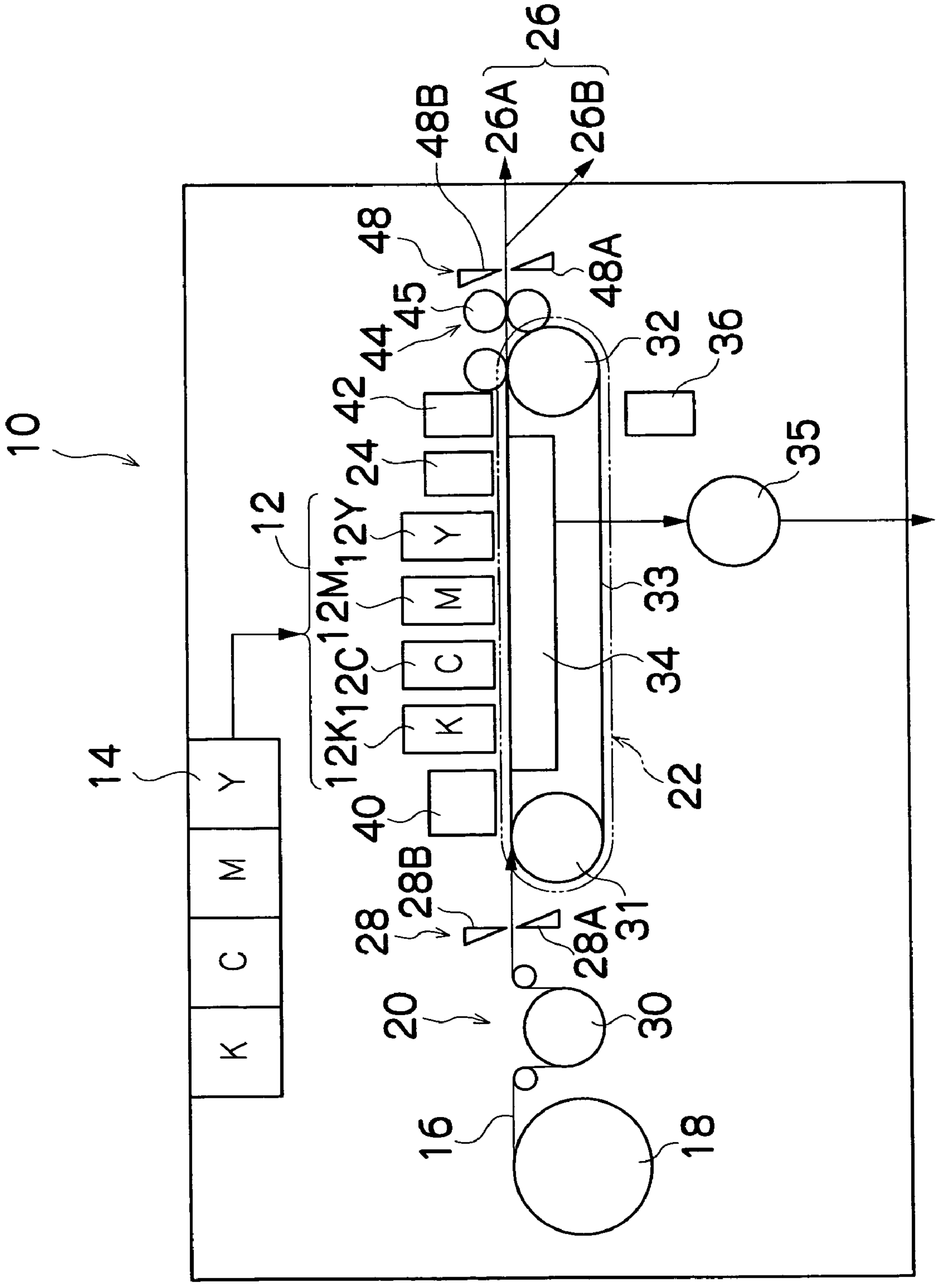
FIG. 1 is a general schematic drawing of an inkjet recording apparatus as an image forming apparatus according to an embodiment of the present invention.

FIG. 1 is a general schematic drawing showing an approximate view of a first embodiment of an inkjet recording apparatus forming an image forming apparatus having a liquid ejection head according to the present invention.

As shown in FIG. 1, the inkjet recording apparatus 10 comprises: a printing unit 12 having a plurality of print heads (liquid ejection heads) 12K, 12C, 12M, and 12Y for ink colors of black (K), cyan (C), magenta (M), and yellow (Y), respectively; an ink storing and loading unit 14 for storing inks of K, C, M and Y to be supplied to the print heads 12K, 12C, 12M, and 12Y; a paper supply unit 18 for supplying recording paper 16; a decurling unit 20 for removing curl in the recording paper 16; a suction belt conveyance unit 22 disposed facing the nozzle face (the surface of the nozzle plate formed with nozzles for ejecting ink) of the print unit 12, for conveying the recording paper 16 while keeping the recording paper 16 flat; a print determination unit 24 for reading the printed result produced by the printing unit 12; and a paper output unit 26 for outputting printed recording paper (printed matter) to the exterior.

In FIG. 1, a magazine for rolled paper (continuous paper) is shown as an embodiment of the paper supply unit 18; however, more magazines with paper differences such as paper width and quality may be jointly provided. Moreover, papers may be supplied with cassettes that contain cut papers loaded in layers and that are used jointly or in lieu of the magazine for rolled paper.

In the case of a configuration in which roll paper is used, a cutter 28 is provided as shown in FIG. 1, and the roll paper is cut to a desired size by the cutter 28. The cutter 28 has a stationary blade 28A, of which length is not less than the width of the conveyor pathway of the recording paper 16, and a round blade 28B, which moves along the stationary blade 28A. The stationary blade 28A is disposed on the reverse side of the printed surface of the recording paper 16, and the round blade 28B is disposed on the printed surface side across the conveyance path. When cut paper is used, the cutter 28 is not required.

In the case of a configuration in which a plurality of types of recording paper can be used, it is preferable that an information recording medium such as a bar code and a wireless tag containing information about the type of paper is attached to the magazine, and by reading the information contained in the information recording medium with a predetermined reading device, the type of paper to be used is automatically determined, and ink-droplet ejection is controlled so that the ink-droplets are ejected in an appropriate manner in accordance with the type of paper.

The recording paper 16 delivered from the paper supply unit 18 retains curl due to having been loaded in the magazine. In order to remove the curl, heat is applied to the recording paper 16 in the decurling unit 20 by a heating drum 30 in the direction opposite to the curl direction in the magazine. At this time, the heating temperature is preferably controlled in such a manner that the recording paper 16 has a curl in which the surface on which the print is to be made is slightly rounded in the outward direction.

The decurled and cut recording paper 16 is delivered to the suction belt conveyance unit 22. The suction belt conveyance unit 22 has a configuration in which an endless belt 33 is set around rollers 31 and 32 so that the portion of the endless belt 33 facing at least the nozzle face of the printing unit 12 and the sensor face of the print determination unit 24 forms a plane (flat plane).

The belt 33 has a width that is greater than the width of the recording paper 16, and a plurality of suction apertures (not shown) are formed on the belt surface. A suction chamber 34 is disposed in a position facing the sensor surface of the print determination unit 24 and the nozzle surface of the printing unit 12 on the interior side of the belt 33, which is set around the rollers 31 and 32, as shown in FIG. 1. The suction chamber 34 provides suction with a fan 35 to generate a negative pressure, and the recording paper 16 on the belt 33 is held by suction.

The belt 33 is driven in the clockwise direction in FIG. 1 by the motive force of a motor 88 (not shown in FIG. 1, but shown in FIG. 7) being transmitted to at least one of the rollers 31 and 32, which the belt 33 is set around, and the recording paper 16 held on the belt 33 is conveyed from left to right in FIG. 1.

Since ink adheres to the belt 33 when a marginless print job or the like is performed, a belt-cleaning unit 36 is disposed in a predetermined position (a suitable position outside the printing area) on the exterior side of the belt 33. Although the details of the configuration of the belt-cleaning unit 36 are not shown, embodiments thereof include a configuration in which the belt 33 is nipped with cleaning rollers such as a brush roller and a water absorbent roller, an air blow configuration in which clean air is blown onto the belt 33, or a combination of these. In the case of the configuration in which the belt 33 is nipped with the cleaning rollers, it is preferable to make the line velocity of the cleaning rollers different than that of the belt 33 to improve the cleaning effect.

The inkjet recording apparatus 10 can comprise a roller nip conveyance mechanism, in which the recording paper 16 is pinched and conveyed with nip rollers, instead of the suction belt conveyance unit 22. However, there is a drawback in the roller nip conveyance mechanism that the print tends to be smeared when the printing area is conveyed by the roller nip action because the nip roller makes contact with the printed surface of the paper immediately after printing. Therefore, the suction belt conveyance in which nothing comes into contact with the image surface in the printing area is preferable.

A heating fan 40 is disposed on the upstream side of the printing unit 12 in the conveyance pathway formed by the suction belt conveyance unit 22. The heating fan 40 blows heated air onto the recording paper 16 to heat the recording paper 16 immediately before printing so that the ink deposited on the recording paper 16 dries more easily.

Figure 2:
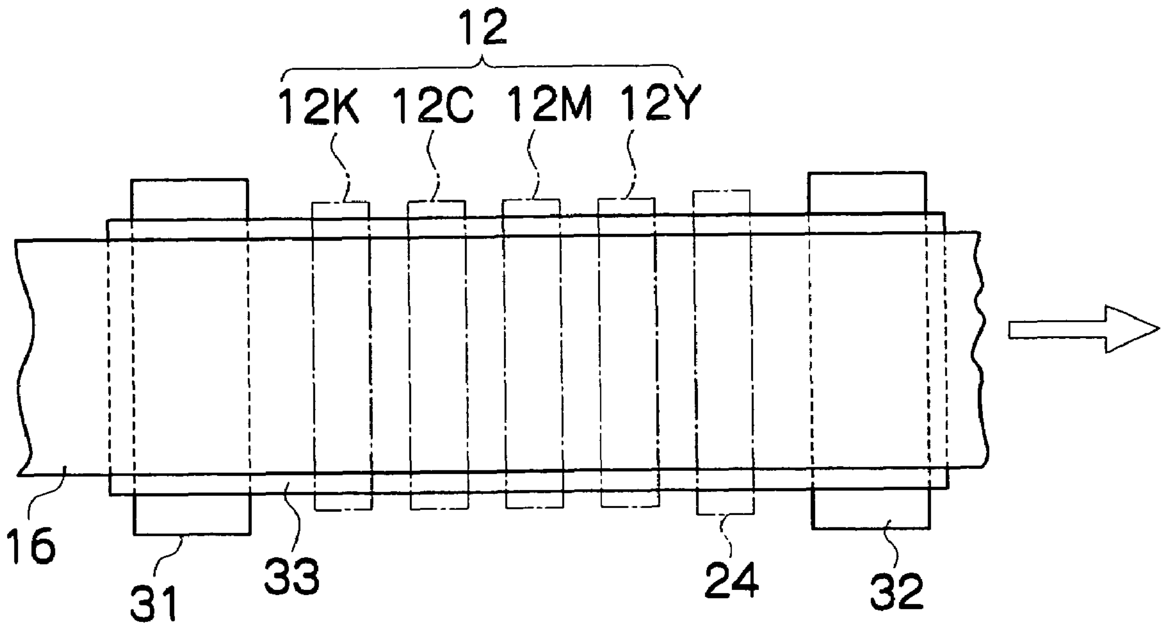
FIG. 2 is a plan view of the principal part of the peripheral area of a print unit in the inkjet recording apparatus in FIG. 1.

The print unit 12 is a so-called "full line head" in which a line head having a length corresponding to the maximum paper width is arranged in a direction (main scanning direction) that is perpendicular to the paper conveyance direction (sub-scanning direction) (see FIG. 2).

As shown in FIG. 2, the print heads 12K, 12C, 12M and 12Y are constituted by line heads in which a plurality of ink ejection ports (nozzles) are arranged through a length exceeding at least one edge of the maximum size recording paper 16 intended for use with the inkjet recording apparatus 10.

The print heads 12K, 12C, 12M, 12Y corresponding to respective ink colors are disposed in the order, black (K), cyan (C), magenta (M) and yellow (Y), from the upstream side (left-hand side in FIG. 1), following the direction of conveyance of the recording paper 16 (the paper conveyance direction). A color print can be formed on the recording paper 16 by ejecting the inks from the print heads 12K, 12C, 12M, and 12Y, respectively, onto the recording paper 16 while conveying the recording paper 16.

The print unit 12, in which the full-line heads covering the entire width of the paper are thus provided for the respective ink colors, can record an image over the entire surface of the recording paper 16 by performing the action of moving the recording paper 16 and the print unit 12 relative to each other in the paper conveyance direction (sub-scanning direction) just once (in other words, by means of a single sub-scan). Higher-speed printing is thereby made possible and productivity can be improved in comparison with a shuttle type head configuration in which a print head moves reciprocally in the direction (main scanning direction) that is perpendicular to the paper conveyance direction.

Here, the terms main scanning direction and sub-scanning direction are used in the following senses. More specifically, in a full-line head comprising rows of nozzles that have a length corresponding to the entire width of the recording paper, "main scanning" is defined as printing one line (a line formed of a row of dots, or a line formed of a plurality of rows of dots) in the breadthways direction of the recording paper (the direction perpendicular to the conveyance direction of the recording paper) by driving the nozzles in one of the following ways: (1) simultaneously driving all the nozzles; (2) sequentially driving the nozzles from one side toward the other; and (3) dividing the nozzles into blocks and sequentially driving the blocks of the nozzles from one side toward the other. The direction indicated by one line recorded by a main scanning action (the lengthwise direction of the band-shaped region thus recorded) is called the "main scanning direction".

On the other hand, "sub-scanning" is defined as to repeatedly perform printing of one line (a line formed of a row of dots, or a line formed of a plurality of rows of dots) formed by the main scanning, while moving the full-line head and the recording paper relatively to each other. The direction in which sub-scanning is performed is called the sub-scanning direction. Consequently, the conveyance direction of the reference point is the sub-scanning direction and the direction perpendicular to same is called the main scanning direction.

Although a configuration with four standard colors, K M C and Y, is described in the present embodiment, the combinations of the ink colors and the number of colors are not limited to these, and light and/or dark inks can be added as required. For example, a configuration is possible in which print heads for ejecting light-colored inks such as light cyan and light magenta are added.

As shown in FIG. 1, the ink storing and loading unit 14 has ink tanks for storing the inks of the colors corresponding to the respective print heads 12K, 12C, 12M, and 12Y, and the respective tanks are connected to the print heads 12K, 12C, 12M, and 12Y by means of channels (not shown). The ink storing and loading unit 14 has a warning device (for example, a display device or an alarm sound generator) for warning when the remaining amount of any ink is low, and has a mechanism for preventing loading errors among the colors.

The print determination unit 24 has an image sensor (line sensor and the like) for capturing an image of the ink-droplet deposition result of the printing unit 12, and functions as a device to check for ejection defects such as clogs of the nozzles in the printing unit 12 from the ink-droplet deposition results evaluated by the image sensor.

The print determination unit 24 of the present embodiment is configured with at least a line sensor having rows of photoelectric transducing elements with a width that is greater than the ink-droplet ejection width (image recording width) of the print heads 12K, 12C, 12M, and 12Y. This line sensor has a color separation line CCD sensor including a red (R) sensor row composed of photoelectric transducing elements (pixels) arranged in a line provided with an R filter, a green (G) sensor row with a G filter, and a blue (B) sensor row with a B filter. Instead of a line sensor, it is possible to use an area sensor composed of photoelectric transducing elements which are arranged two-dimensionally.

The print determination unit 24 reads a test pattern image printed by the print heads 12K, 12C, 12M, and 12Y for the respective colors, and the ejection of each head is determined. The ejection determination includes the presence of the ejection, measurement of the dot size, and measurement of the dot deposition position.

A post-drying unit 42 is disposed following the print determination unit 24. The post-drying unit 42 is a device to dry the printed image surface, and includes a heating fan, for example. It is preferable to avoid contact with the printed surface until the printed ink dries, and a device that blows heated air onto the printed surface is preferable.

In cases in which printing is performed with dye-based ink on porous paper, blocking the pores of the paper by the application of pressure prevents the ink from coming contact with ozone and other substance that cause dye molecules to break down, and has the effect of increasing the durability of the print.

A heating/pressurizing unit 44 is disposed following the post-drying unit 42. The heating/pressurizing unit 44 is a device to control the glossiness of the image surface, and the image surface is pressed with a pressure roller 45 having a predetermined uneven surface shape while the image surface is heated, and the uneven shape is transferred to the image surface.

The printed matter generated in this manner is outputted from the paper output unit 26. The target print (i.e., the result of printing the target image) and the test print are preferably outputted separately. In the inkjet recording apparatus 10, a sorting device (not shown) is provided for switching the outputting pathways in order to sort the printed matter with the target print and the printed matter with the test print, and to send them to paper output units 26A and 26B, respectively. When the target print and the test print are simultaneously formed in parallel on the same large sheet of paper, the test print portion is cut and separated by a cutter (second cutter) 48. The cutter 48 is disposed directly in front of the paper output unit 26, and is used for cutting the test print portion from the target print portion when a test print has been performed in the blank portion of the target print. The structure of the cutter 48 is the same as the first cutter 28 described above, and has a stationary blade 48A and a round blade 48B.

Although not shown in the drawing, the paper output unit 26A for the target prints is provided with a sorter for collecting prints according to print orders.

Next, the arrangement of nozzles (liquid ejection ports) in the print head (liquid ejection head) will be described. The print heads 12K, 12C, 12M and 12Y provided for the respective ink colors each have the same structure, and a print head 50 as a representative embodiment of these print heads is hereinafter described in detail.

Figure 3:
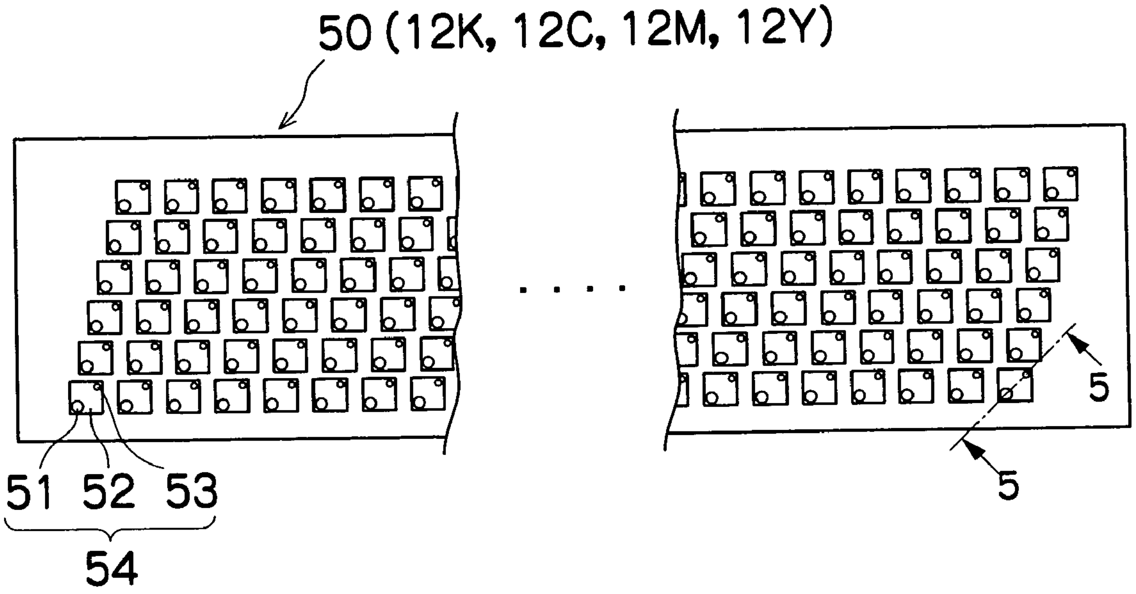
FIG. 3 is a plan perspective diagram showing an embodiment of the structure of a print head.

FIG. 3 shows a plan view perspective diagram of the print head 50. As shown in FIG. 3, the print head 50 according to the present embodiment achieves a high density arrangement of nozzles 51 by using a two-dimensional staggered matrix array of pressure chamber units 54, each constituted by a nozzle for ejecting ink as ink droplets, a pressure chamber 52 for applying pressure to the ink in order to eject ink, and an ink supply port 53 for supplying ink to the pressure chamber 52 from a liquid supply chamber (not shown in FIG. 3).

In the embodiment shown in FIG. 3, the pressure chambers 52 each have an approximately square planar shape when viewed from above, but the planar shape of the pressure chambers 52 is not limited to a square shape. As shown in FIG. 3, a nozzle 51 is formed at one end of a diagonal of each pressure chamber 52, and an ink supply port 53 is provided at the other end of the diagonal.

Figure 4:
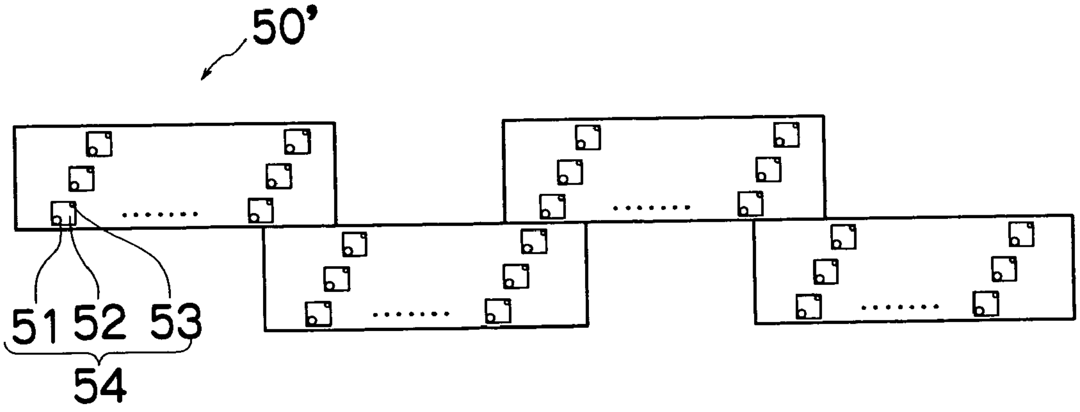
FIG. 4 is a plan view showing a further embodiment of a print head.

FIG. 4 is a plan view perspective diagram showing a further embodiment of the structure of a print head. As shown in FIG. 4, one long full line head may be constituted by combining a plurality of short heads 50' arranged in a two-dimensional staggered array, in such a manner that the combined length of this plurality of short heads 50' corresponds to the full width of the print medium.

Figure 5:
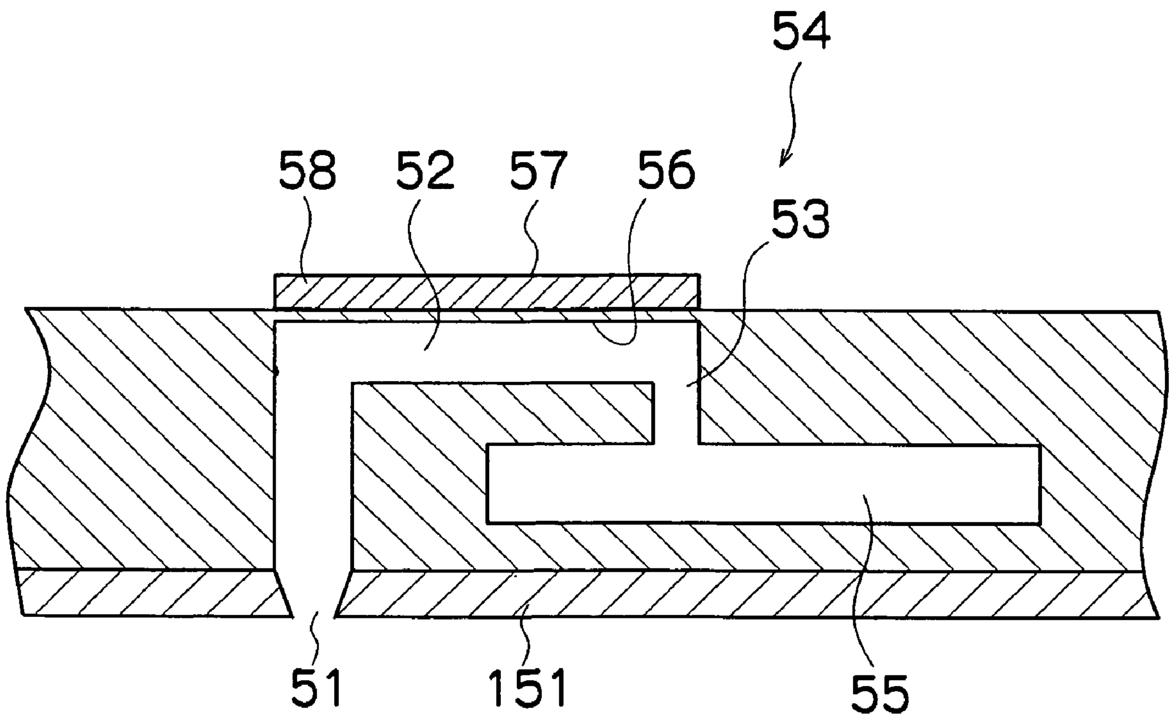
FIG. 5 is a cross-sectional diagram along line 5-5 in FIG. 3.

FIG. 5 shows a cross-sectional diagram along line 5-5 in FIG. 3. As shown in FIG. 5, a nozzle plate 151 is formed in which nozzles 51 for ejecting ink is arranged at the bottommost layer in the pressure chamber unit 54. The pressure chamber units 54 are each formed principally by the nozzle 51 and the pressure chamber 52 connected to same. Furthermore, as well as being connected to the nozzle 51, the pressure chamber 52 is also connected to the supply liquid chamber 55, which supplies ink via the ink supply port 53. Furthermore, one surface (in FIG. 5, the ceiling) of the pressure chamber 52 is constituted by a diaphragm 56, and a piezoelectric element 58 which causes the diaphragm 56 to deform by applying a pressure to the diaphragm 56 is bonded on top of the diaphragm 56, and an individual electrode 57 is formed on the upper surface of the piezoelectric element 58. Furthermore, the diaphragm 56 also serves as a common electrode.

The piezoelectric element 58 is sandwiched between the common electrode (diaphragm 56) and the individual electrode 57, and it deforms when a drive voltage is applied between these two electrodes 56 and 57. The diaphragm 56 is pressed by the deformation of the piezoelectric element 58, in such a manner that the volume of the pressure chamber 52 is reduced and ink is ejected from the nozzle 51. When the voltage applied between the two electrodes 56 and 57 is released, the piezoelectric element 58 returns to its original position, the volume of the pressure chamber 52 returns to its original size, and new ink is supplied into the pressure chamber 52 from the liquid supply chamber 55 and via the supply port 53.

Figure 6:
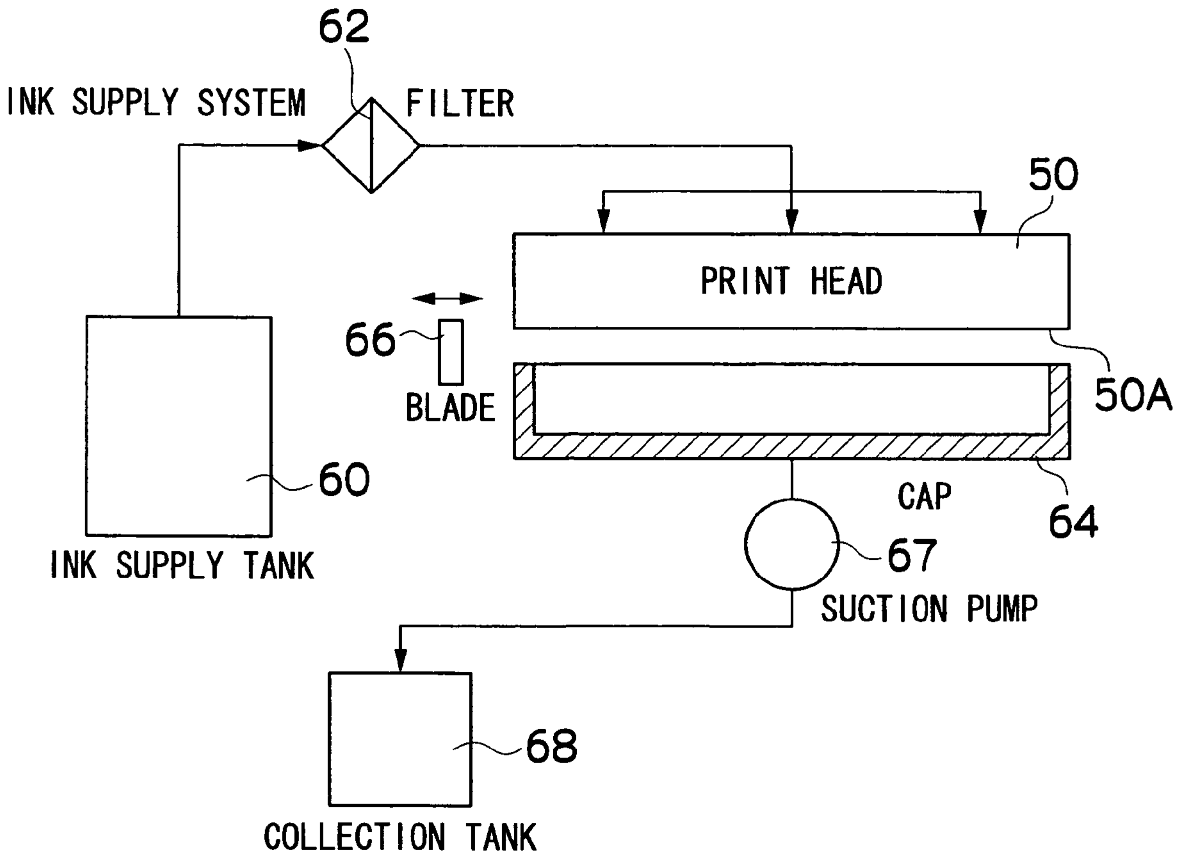
FIG. 6 is a schematic drawing showing the composition of an ink supply system in the inkjet recording apparatus.

FIG. 6 is a schematic drawing showing the configuration of the ink supply system in the inkjet recording apparatus 10. The ink tank 60 is a base tank that supplies ink to the print head 50 and is set in the ink storing and loading unit 14 described with reference to FIG. 1. The aspects of the ink tank 60 include a refillable type and a cartridge type: when the remaining amount of ink is low, the ink tank 60 of the refillable type is filled with ink through a filling port (not shown) and the ink tank 60 of the cartridge type is replaced with a new one. In order to change the ink type in accordance with the intended application, the cartridge type is suitable, and it is preferable to represent the ink type information with a bar code or the like on the cartridge, and to perform ejection control in accordance with the ink type. The ink tank 60 in FIG. 6 is equivalent to the ink storing and loading unit 14 in FIG. 1 described above.

A filter 62 for removing foreign matters and bubbles is disposed in the middle of the channel connecting the ink tank 60 and the print head 50 as shown in FIG. 6. The filter mesh size in the filter 62 is preferably equivalent to or less than the diameter of the nozzle in the print head 50 and commonly about 20 μm.

Although not shown in FIG. 6, it is preferable to provide a sub-tank integrally to the print head 50 or nearby the print head 50. The sub-tank has a damper function for preventing variation in the internal pressure of the head and a function for improving refilling of the print head.

The inkjet recording apparatus 10 is also provided with a cap 64 as a device to prevent the nozzles from drying out or to prevent an increase in the ink viscosity in the vicinity of the nozzles, and a cleaning blade 66 as a device to clean the nozzle face (the surface of a nozzle plate 151) 50A.

A maintenance unit including the cap 64 and the cleaning blade 66 can be relatively moved with respect to the print head 50 by a movement mechanism (not shown), and is moved from a predetermined holding position to a maintenance position below the print head 50 as required.

The cap 64 is displaced up and down relatively with respect to the print head 50 by an elevator mechanism (not shown).

When the power of the inkjet recording apparatus 10 is turned OFF or when in a print standby state, the cap 64 is raised to a predetermined elevated position by the elevator mechanism so as to come into close contact with the print head 50, and the nozzle area of the nozzle face 50A is thereby covered with the cap 64.

The cleaning blade 66 is composed of rubber or another elastic member, and can slide on the ink ejection surface (nozzle surface 50A) of the print head 50 by means of a blade movement mechanism (not shown). If there are ink droplets or foreign matter adhering to the nozzle surface 50A, then the nozzle surface 50A is wiped by causing the cleaning blade 66 to slide over the nozzle surface 50A, thereby cleaning same.

During printing or standby, when the frequency of use of specific nozzles 51 is reduced and ink viscosity increases in the vicinity of the nozzles 51, a preliminary discharge is made to eject the degraded ink due to the increased viscosity toward the cap 64.

Also, when bubbles have become intermixed in the ink inside the print head 50 (ink inside the pressure chamber 52), the cap 64 is placed on the print head 50, the ink inside the pressure chamber 52 (the ink in which bubbles have become intermixed) is removed by suction with a suction pump 67, and the suction-removed ink is sent to a collection tank 68. This suction action entails the suctioning of degraded ink of which viscosity has increased (hardened) also when initially loaded into the head, or when service has started after a long period of being stopped.

More specifically, when a state in which ink is not ejected from the print head 50 continues for a certain amount of time or longer, the ink solvent in the vicinity of the nozzles 51 evaporates and ink viscosity increases. In such a state, ink can no longer be ejected from the nozzle 51 even if the pressure generating devices for the ejection driving (not shown but described later) is operated. Before reaching such a state (in a viscosity range that allows ejection by the operation of the pressure generating devices) the pressure generating devices are operated to perform the preliminary discharge to eject the ink of which viscosity has increased in the vicinity of the nozzle toward the ink receptor. After the nozzle face 50A is cleaned by a wiper such as the cleaning blade 66 provided as the cleaning device for the nozzle face 50A, a preliminary discharge is also carried out in order to prevent the foreign matter from becoming mixed inside the nozzles 51 by the wiper sliding operation. The preliminary discharge is also referred to as “dummy discharge”, “purge”, “liquid discharge”, and so on.

When bubbles have become intermixed in the nozzle 51 or inside the pressure chamber 52, or when the ink viscosity inside the nozzle 51 has increased over a certain level, ink can no longer be ejected by the preliminary discharge, so the suctioning action described above is carried out.

More specifically, when bubbles have become intermixed into the ink inside the nozzles 51 and the pressure chambers 52, or when the viscosity of the ink in the nozzle 51 has increased to a certain level or more, ink can no longer be ejected from the nozzles 51 even if the pressure generating devices are operated. In a case of this kind, the cap 64 is placed on the nozzle surface 50A of the print head 50, and the ink containing air bubbles or the ink of increased viscosity inside the pressure chambers 52 is suctioned by the pump 67.

However, this suction action is performed with respect to all of the ink in the pressure chambers 52, and therefore the amount of ink consumption is considerable. Consequently, it is desirable that a preliminary ejection is carried out, whenever possible, while the increase in viscosity is still minor. The cap 64 shown in FIG. 6 functions as a suctioning device and it may also function as an ink receptacle for preliminary ejection.

Moreover, desirably, the inside of the cap 64 is divided by means of partitions into a plurality of areas corresponding to the nozzle rows, thereby achieving a composition in which suction can be performed selectively in each of the demarcated areas, by means of a selector, or the like.

Figure 7:
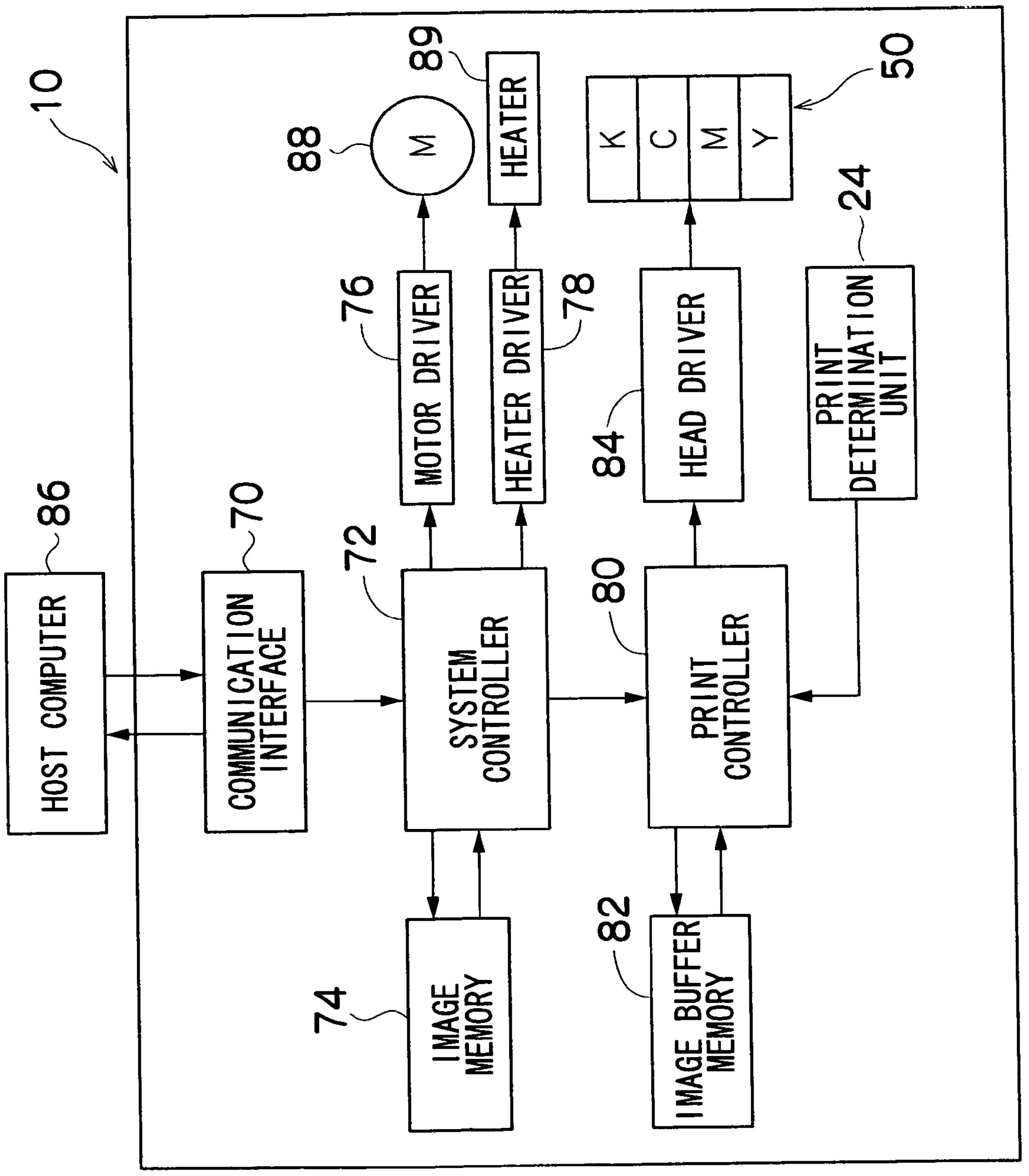
FIG. 7 is a partial block diagram showing the system composition of the inkjet recording apparatus.

FIG. 7 is a principal block diagram showing the system configuration of the inkjet recording apparatus 10.

As shown in FIG. 7, the inkjet recording apparatus 10 comprises a communication interface 70, a system controller 72, an image memory 74, a motor driver 76, a heater driver 78, a print controller 80, an image buffer memory 82, a head driver 84, and the like.

The communication interface 70 is an interface unit for receiving image data sent from a host computer 86. A serial interface such as USB, IEEE1394, Ethernet, wireless network, or a parallel interface such as a Centronics interface may be used as the communication interface 70. A buffer memory (not shown) may be mounted in this portion in order to increase the communication speed. The image data sent from the host computer 86 is received by the inkjet recording apparatus 10 through the communication interface 70, and is temporarily stored in the image memory 74. The image memory 74 is a storage device for temporarily storing images inputted through the communication interface 70, and data is written and read to and from the image memory 74 through the system controller 72. The image memory 74 is not limited to a memory composed of semiconductor elements, and a hard disk drive or another magnetic medium may be used.

The system controller 72 is a control unit for controlling the various sections, such as the communications interface 70, the image memory 74, the motor driver 76, the heater driver 78, and the like. The system controller 72 is constituted by a central processing unit (CPU) and peripheral circuits thereof, and the like, and in addition to controlling communications with the host computer 86 and controlling reading and writing from and to the image memory 74, or the like, it also generates a control signal for controlling the motor 88 of the conveyance system and the heater 89.

The motor driver (drive circuit) 76 drives the motor 88 in accordance with commands from the system controller 72. The heater driver (drive circuit) 78 drives the heater 89 of the post-drying unit 42 or the like in accordance with commands from the system controller 72.

The print controller 80 has a signal processing function for performing various tasks, compensations, and other types of processing for generating print control signals from the image data stored in the image memory 74 in accordance with commands from the system controller 72 so as to supply the generated print control signals (print data) to the head driver 84. Prescribed signal processing is carried out in the print controller 80, and the ejection amount and the ejection timing of the ink droplets from the respective print heads 50 are controlled via the head driver 84, on the basis of the print data. By this means, prescribed dot size and dot positions can be achieved.

The print controller 80 is provided with the image buffer memory 82; and image data, parameters, and other data are temporarily stored in the image buffer memory 82 when image data is processed in the print controller 80. The aspect shown in FIG. 7 is one in which the image buffer memory 82 accompanies the print controller 80; however, the image memory 74 may also serve as the image buffer memory 82.

Also possible is an aspect in which the print controller 80 and the system controller 72 are integrated to form a single processor.

The head driver 84 drives the pressure generating devices of the print heads 50 of the respective colors, on the basis of the print data supplied from the print controller 80. A feedback control system for maintaining constant drive conditions in the heads may be included in the head driver 84.

The print determination unit 24 is a block that includes the line sensor (not shown) as described above with reference to FIG. 1, reads the image printed on the recording paper 16, determines the print conditions (presence of the ejection, variation in the dot formation, and the like) by performing desired signal processing, or the like, and provides the determination results of the print conditions to the print controller 80.

According to requirements, the print controller 80 makes various corrections with respect to the print head 50 on the basis of information obtained from the print determination unit 24.

Below, a method of manufacturing the nozzle plate according to the present invention will be described.

FIGS. 8A to 8F show steps of a method of manufacturing the nozzle plate relating to the first embodiment of the present invention. FIGS. 8A to 8F show the steps of forming a liquid-repelling film onto the nozzle plate, in particular.

The present embodiment relates to a case where the nozzle plate is made of a resin, such as polyimide, and a protective sheet is bonded onto the nozzle plate in which nozzle apertures have not yet been formed, and when the nozzle apertures are formed, holes for introducing filling material are formed also in the protective sheet.

Figure 8A:
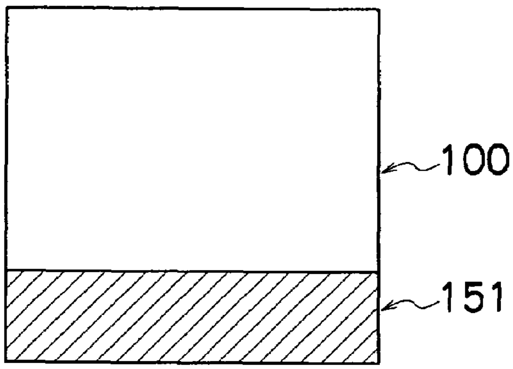
FIGS. 8A to 8F are step diagrams showing a method of manufacturing a nozzle plate according to a first embodiment of the invention.

Firstly, as shown in FIG. 8A, a protective sheet 100 is bonded onto the surface of the nozzle plate 151 in which nozzle apertures have not yet been formed. Here, the nozzle plate 151 is a resin, such as polyimide, for example, and the protective sheet 100 is a resin sheet made of polyimide, or the like, having a sticking agent or adhesive applied thereto, for example. The thickness of the nozzle plate 151 is approximately 30 μm, and the thickness of the protective sheet 100 is approximately 100 μm to 500 μm.

Figure 8B:
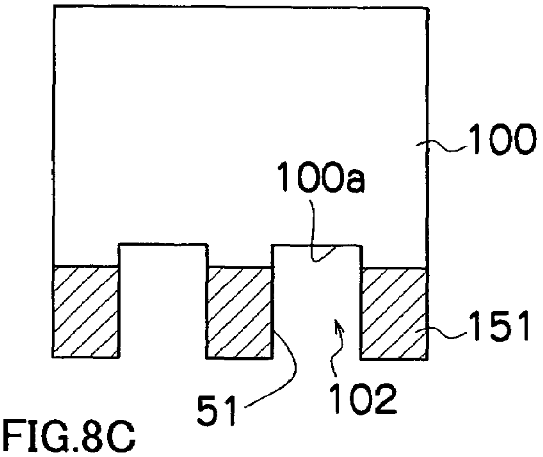

Next, as shown in FIG. 8B, holes 102 are opened from the nozzle plate 151 through to the protective sheet 100 by dry etching or laser processing from the rear surface (reverse to the surface to be the nozzle surface 50A) of the nozzle plate 151. In this hole forming process, bottomed holes **100*a* of the same size as the nozzles 51 are created in the protective sheet 100 simultaneously with the formation of the nozzles 51, and these holes 100*a* pass completely through the nozzle plate 151**.

In this way, since the holes are processed up to the protective sheet 100 continuously with the formation of the nozzles, it is possible to form the holes **100*a* of the same size as the nozzles 51 in the protective sheet 100 also, and hence there is no occurrence of step differences or gaps between the nozzle plate 151 and the protective sheet 100**, and no additional work is required. This hole processing is described later.

Figure 8C:
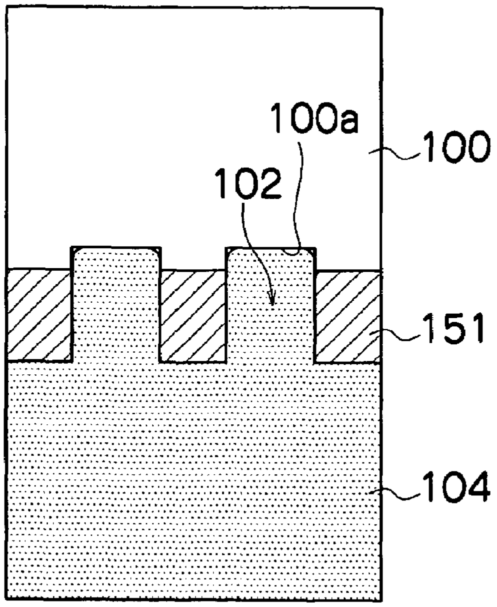

Next, as shown in FIG. 8C, a filling material 104 is introduced into the holes 102 from the side of the rear surface of the nozzle plate 151. In this case, it is sufficient that the filling material 104 is introduced into each hole 102 so as to reach a part of the protective sheet 100, and it is not necessary to fill the filling material 104 without gaps, into every corner of the bottomed holes **100*a* in the protective sheet 100**.

There are no particular restrictions of the filling material 104 and it is suitable to use a urethane type dry film resist, or the like, for example. Besides this, it is also possible to use a liquid resist as the filling material 104. The thickness of the filling material 104 is, for example, between 100 μm and 300 μm, approximately.

Figure 8D:
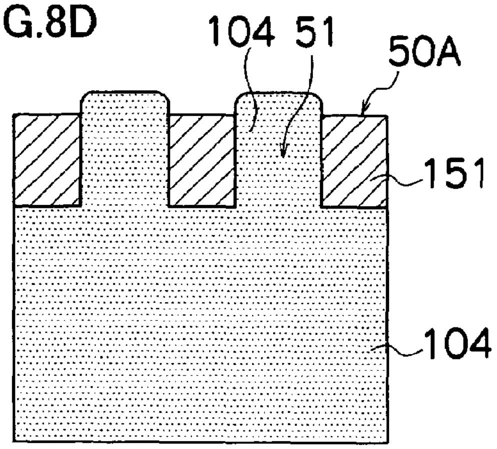

Next, the protective sheet 100 is peeled away, as shown in FIG. 8D. Consequently, the surface of the nozzle plate 151 (nozzle surface 50A) is exposed and portions of the filling material 104 project from the nozzles 51.

Figure 8E:
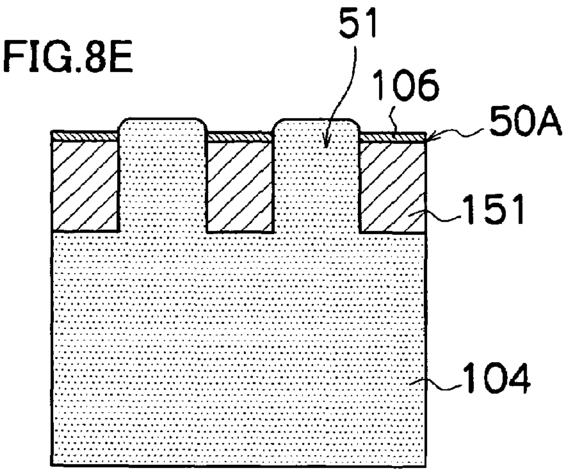

Next, as shown in FIG. 8E, a liquid-repelling film 106 is formed on the nozzle surface 50A on the front surface of the nozzle plate 151. In this case, since the filling material 104 projects from the nozzles 51 beyond the nozzle surface 50A, and the nozzles 51 are closed by the filling material 104, then the liquid-repelling film 106 does not enter into the nozzles 51.

Moreover, in this case, in order that the liquid-repelling film 106 is formed uniformly at the periphery of the nozzles 51, it is necessary that the filling material 104 projects from the nozzles 51 to a greater height than the thickness of the liquid-repelling film 106. The thickness of the liquid-repelling film 106 is several micrometers.

There are no particular restrictions of the liquid-repelling film, and it is possible to use a fluoroplastic resin, a silicone resin, or the like.

Figure 8F:
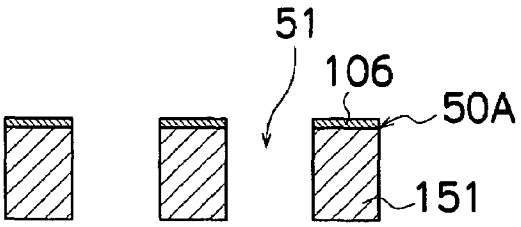

Finally, as shown in FIG. 8F, by removing the filling material 104, the nozzle plate 151 is obtained in which the liquid-repelling film 106 is formed uniformly on the nozzle surface 50A, with the exception of the areas of the nozzles 51.

It is also possible to perform washing before the filling material 104 is filled into the holes 102, after creating the holes in the nozzle plate 151 and the protective sheet 100. This washing may be liquid washing using pure water, or the like, or washing by blowing air. By performing washing before introducing the filling material 104, thereby removing the dirt inside the holes 102, it is possible to prevent filling faults of the filling material 104 and uneven formation of the liquid-repelling film 106.

Furthermore, as the protective sheet 100, it is possible to use a sheet having properties whereby the sheet loses adhesive force when irradiated with light, such as ultraviolet light, or when heat is applied. By using a protective sheet 100 having properties of this kind, the protective sheet 100 can be peeled away readily by causing the protective sheet 100 to lose adhesive force before it is separated. Therefore, it is possible to prevent deformation of the nozzle plate 151 due to the application of a large stress when separating the protective sheet 100.

Next, the method of forming the holes 102 shown in FIG. 8B in the nozzle plate 151 and the protective sheet 100 will be described with reference to FIGS. 9A to 9E.

Figure 9A:
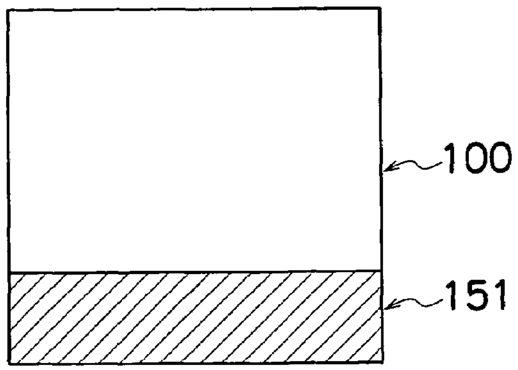
FIGS. 9A to 9E are step diagrams showing the processing of holes for nozzles, and the like, in the first embodiment.
Figure 9D:
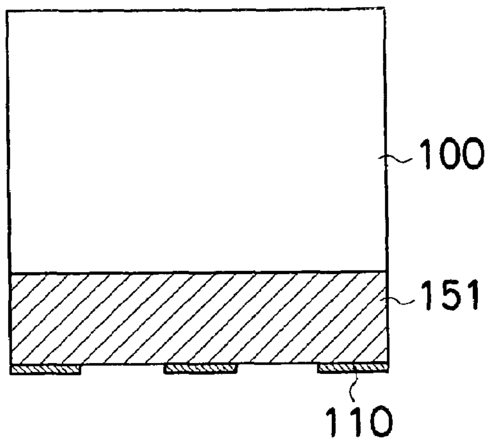
Figure 9B:
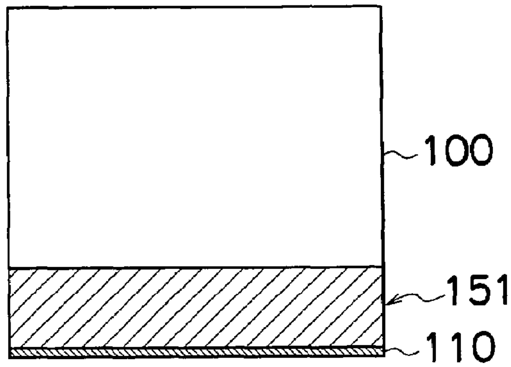

Firstly, as shown in FIG. 9A, the protective sheet 100 is applied to the nozzle plate 151, whereupon a resist 110 is applied on the rear surface (reverse to the surface on which the protective sheet 100 has been applied) of the nozzle plate 151, as shown in FIG. 9B.

Figure 9E:
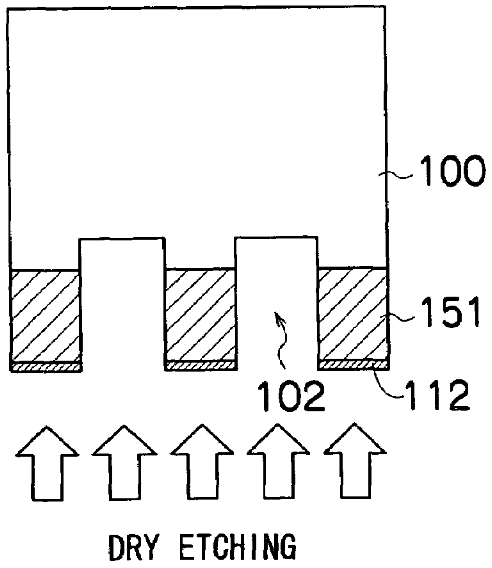
Figure 9C:
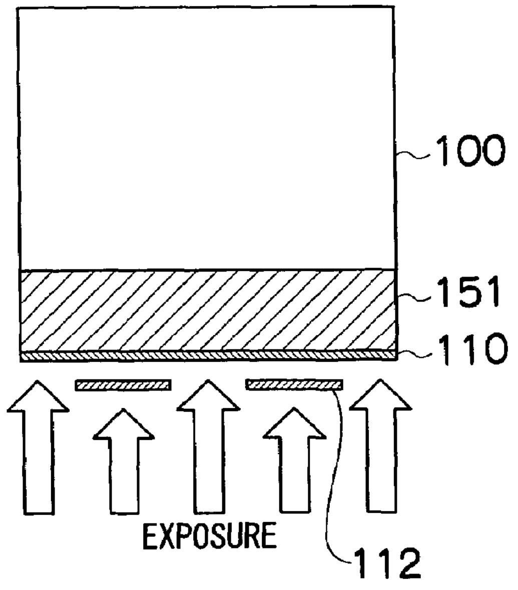

Next, light exposure is performed, using a mask 112, as shown in FIG. 9C, whereupon a mask for forming the holes 102 is formed by developing the exposed resist 110 as shown in FIG. 9D. Finally, dry etching is performed using the resist 110 as the mask, as shown in FIG. 9E, and the holes 102 extending from the nozzle plate 151 to the protective sheet 100 are formed.

In this way, by forming the holes 102 by dry etching, it is possible to process the holes simultaneously on the whole surface of the nozzle plate 151, with good processing accuracy. As stated above, the steps for forming the mask is required, and there are restrictions on the size of the apparatus and a large surface area cannot be processed.

On the other hand, in a method which processes the holes 102 by using a laser, there is no need to form a mask on the whole surface (although a metal mask may be used to shape the laser beam), and a large surface area can be processed. However, in the case of a method using a laser, it is only possible to process one hole or at most several holes in one operation, and if there is a large number of holes 102, then a long processing time is required. Moreover, processing accuracy is poor compared to dry etching.

As described above, according to the present embodiment, by processing holes (bottomed holes) having the same size as the nozzles in the protective sheet, by processing the nozzle plate and the protective sheet simultaneously, the filling material is introduced up to the protective sheet, and hence the filling material is introduced uniformly in the periphery of the nozzles without forming gaps between the nozzles, and the liquid-repelling film can also be formed uniformly in the periphery of the nozzles.

Next, a method of manufacturing a nozzle plate according to a second embodiment of the present invention will be described. The second embodiment differs from the first embodiment described above in that a protective sheet is applied to a metal nozzle plate having been formed with nozzles, and that holes of the same diameter as the nozzles are formed by processing the protective sheet by using the nozzle plate as a mask.

FIGS. 10A to 10F show the method for forming the liquid-repelling film on the nozzle plate in the present embodiment.

Figure 10A:
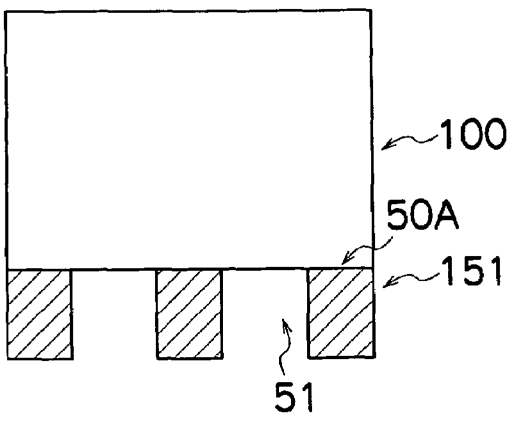
FIGS. 10A to 10F are step diagrams showing a method of manufacturing a nozzle plate according to a second embodiment of the invention.

Firstly, as shown in FIG. 10A, nozzles 51 are formed in a metal nozzle plate 151, whereupon a protective sheet 100 is applied to the nozzle surface 50A. Here, the metal used to form the nozzle plate 151 is not limited in particular, and stainless steel, nickel, or the like, are suitable materials, for example. Moreover, similarly to the first embodiment described above, the material of the protective sheet 100 can be a resin sheet of polyimide, for example.

Figure 10B:
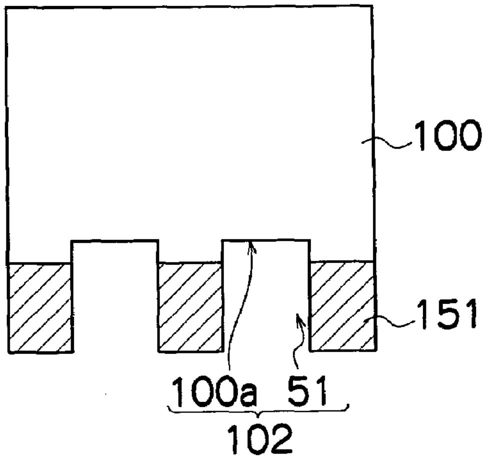

Next, as shown in FIG. 10B, holes 100*a* are formed in the protective sheet 100 by using the nozzle plate 151 formed with the nozzles 51 as a mask. The holes 100*a* may be processed by dry etching or laser machining. If a laser is used, then it is necessary to adjust the output of the laser in such a manner that only the resin protective sheet 100 is processed, without processing the metal nozzle plate 151. Therefore, dry etching is desirable.

Since the nozzle plate 151 itself is used as the mask, then it is possible to form the holes 100*a* of the same size as the nozzles 51 in the protective sheet 100, and the nozzles 51 and the holes 100*a* in the protective sheet 100 compose the continuous holes 102 with no step differences.

Figure 10C:
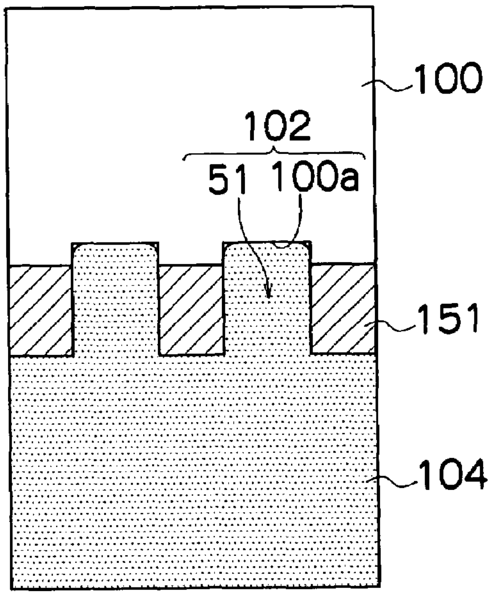

Next, as shown in FIG. 10C, a filling material 104 is introduced into the holes 102 from the side of the rear surface of the nozzle plate 151, in such a manner that the filling material 104 reaches to the protective sheet 100.

Figure 10D:
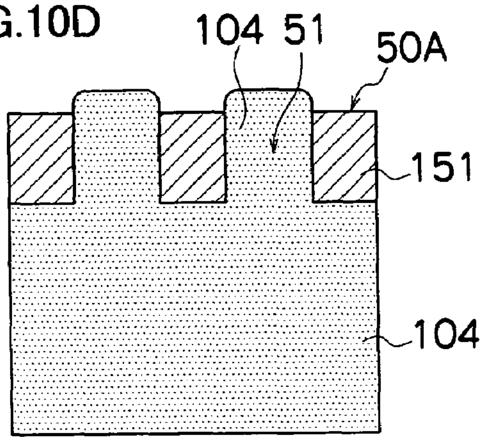

Next, as shown in FIG. 10D, the protective sheet 100 is peeled away and the nozzle surface 50A is exposed. The filling material 104 is made to project from the nozzles 51 beyond the nozzle surface 50A.

Figure 10E:
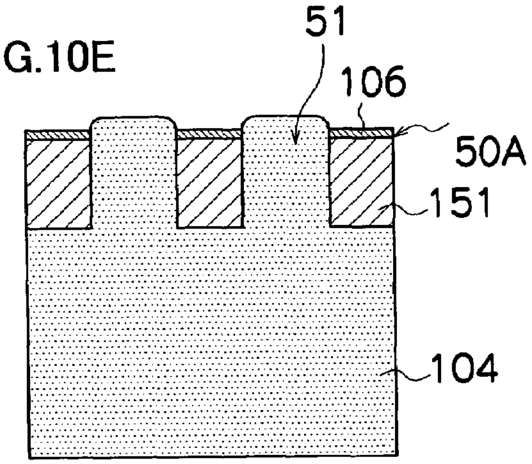

Next, as shown in FIG. 10E, a liquid-repelling film 106 is formed on the nozzle surface 50A on the front surface of the nozzle plate 151. In this case, since the filling material 104 projects from the nozzles 51 beyond the nozzle surface 50A, it is possible to form the liquid-repelling film 106 uniformly at the periphery of the nozzles 51.

Figure 10F:
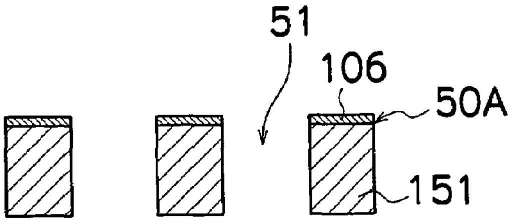

Finally, as shown in FIG. 10F, by removing the filling material 104, the nozzle plate 151 is formed in which the liquid-repelling film 106 is formed uniformly on the nozzle surface 50A, with the exception of the areas of the nozzles 51.

In the case of the second embodiment, in this way, the nozzle plate 151 itself is used as the mask, and it becomes unnecessary to perform steps of forming the mask for forming the holes in the protective sheet, as in the first embodiment described above.

If a metal nozzle plate is used as in the present embodiment, it is also possible to process holes in the nozzles and the protective sheet after applying the protective sheet on the nozzle plate, as in the first embodiment. However, in this case, it is necessary to take measures to prevent the resin protective sheet from peeling away from the metal nozzle plate. Hence, it is desirable to apply a protective sheet on a nozzle plate after forming nozzles in the nozzle plate, and to process holes in the protective sheet only, since this makes it possible to select a variety of processing methods.

Furthermore, as in the first embodiment, even in the case of using a resin nozzle plate, it is also possible to apply a protective sheet after forming nozzles in the nozzle plate, and to then form holes in the nozzles and the protective sheet; however, as stated previously, in this case, better efficiency is achieved if processing is carried out simultaneously.

Next, a third embodiment of the present invention will be described.

In the first and second embodiments described hitherto, when forming holes in the protective sheet, the holes are bottomed holes which do not pass through the protective sheet. On the other hand, in the third embodiment, when holes are formed in the protective sheet, the holes pass through the sheet.

FIGS. 11A to 11F show steps of a method of manufacturing a nozzle plate according to the third embodiment.

Figure 11A:
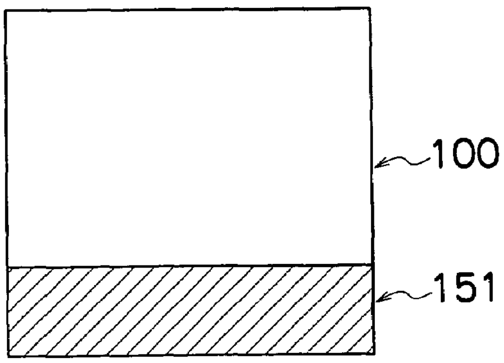
FIGS. 11A to 11F are step diagrams showing a method of manufacturing a nozzle plate according to a third embodiment of the invention.
Figure 11B:
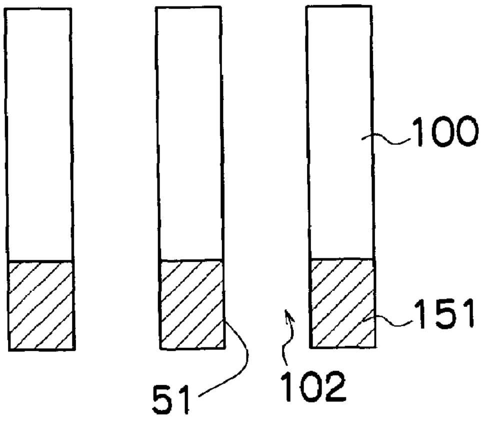

As shown in FIGS. 11A to 11F, the third embodiment is similar to the first and second embodiments described above, up to the processing of the holes after applying the protective sheet to the nozzle plate. As shown in FIG. 11B, the holes formed in the protective sheet are formed in such a manner that they pass through the protective sheet.

Figure 11C:
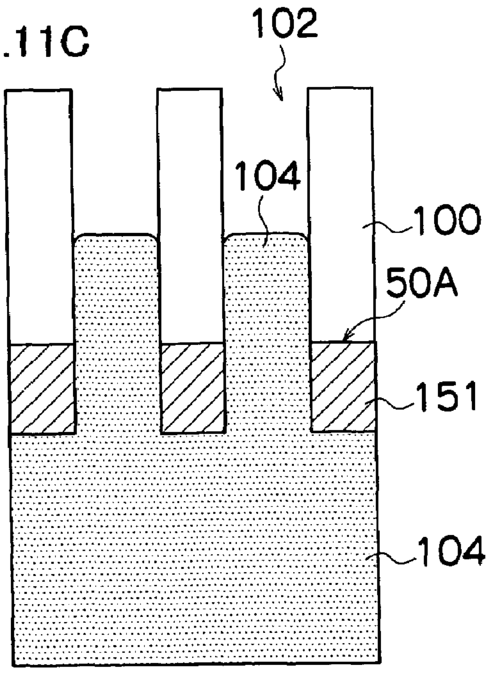

As shown in FIG. 11C, a filling material 104 is introduced into the holes 102 passing through the protective sheet 100, from the rear surface side, to which the protective sheet 100 is not applied, of the nozzle plate 151. The filling material 104 is introduced into each hole 102, until the filling material 104 passes beyond the nozzle surface 50A and reaches a part of the protective sheet 100.

In this case, since the holes 102 pass through the protective sheet 100, when the filling material 104 is introduced, it is possible to observe the state of filling of the filling material 104 from above, and hence filling can be performed reliably. Consequently, there is no occurrence of situations where the filling material 104 fails to be introduced to a level above the nozzle surface 50A, due to insufficient filling, and hence non-uniformities in the subsequent formation of the liquid-repelling film can be prevented.

Furthermore, if the interior of the holes 102 is washed before introducing filling material 104, then dirt can be removed more readily than in the case of bottomed holes.

Figure 11D:
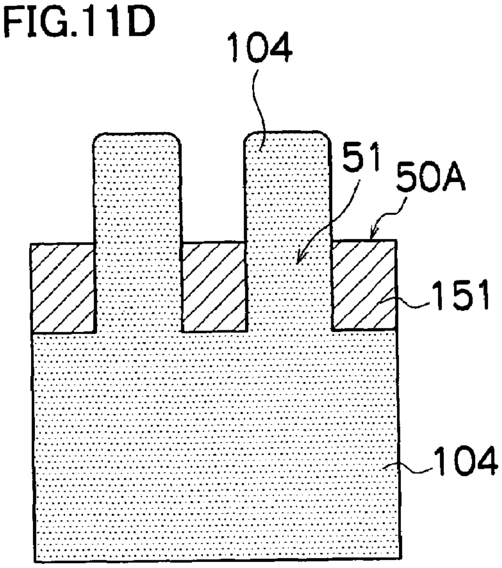
Figure 11E:
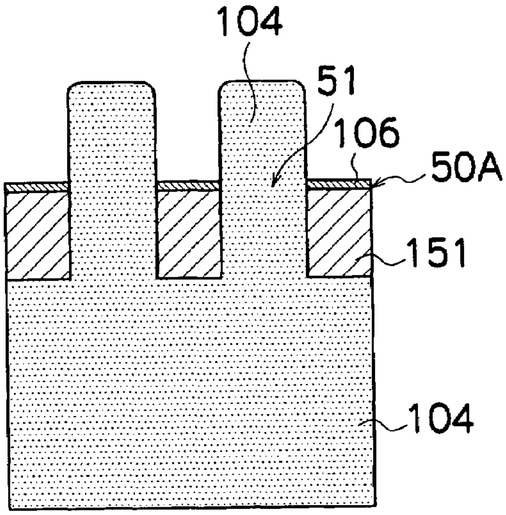
Figure 11F:
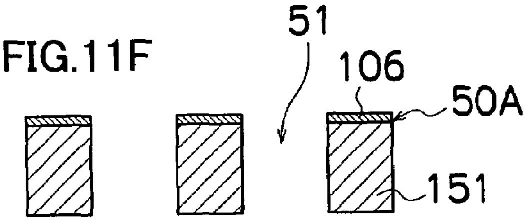

As shown in FIGS. 11D to 11F, after introducing the filling material 104 into the through holes 102, similarly to the aforementioned embodiments, the protective sheet 100 is peeled away, the liquid-repelling film is formed on the nozzle surface 50A, and the filling material 104 is removed, thereby forming the nozzle plate 151.

Figure 12:
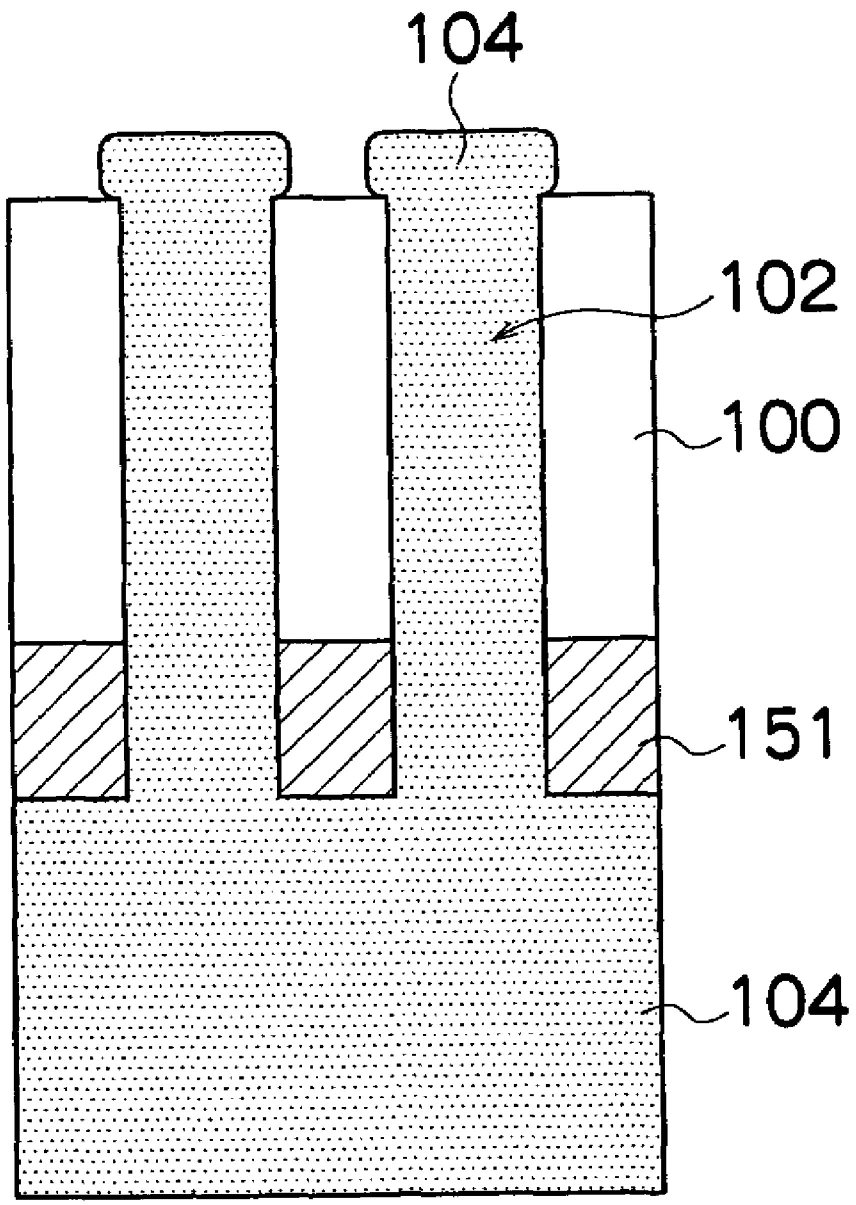
FIG. 12 is an illustrative diagram showing a problem in the third embodiment.

Furthermore, in the third embodiment, the filling material 104 may project above the holes 102 in some degree when the filling material 104 is introduced, so long as the filling material 104 does not spread over the surface of the protective sheet 100. However, as shown in FIG. 12, if an excessive amount of filling material 104 is introduced and the filling material 104 projects from the holes 102 and onto the protective sheet 100, then it becomes difficult to peel away the protective sheet 100. In a case of this kind, it is necessary to cut away the projecting filling material 104. The surface of the protective sheet 100 may also be cut away at the same time.

Here, since the holes 102 are through holes, then if the state of filling of the filling material 104 is observed from above during filling, excessive filing can be avoided and a sufficient amount of filling material 104 can be introduced. The observation of the state of filling can be carried out visually by an operator, or automatically by using sensors.

In the third embodiment, it is possible to carry out filling of the filling material 104 in a reliable fashion; however, the formation of the through holes takes a longer time than the formation of bottomed holes. On the other hand, in the case of the first and second embodiments described above, since the holes are bottomed holes, only a short processing time is required, but the state of filling of the filling material 104 cannot be known during filling.

Therefore, in the fourth embodiment described below, although the holes do not pass through the protective sheet, the base portions of the holes are formed sufficiently thin to allow the state of filling of the filling material 104 to be known during filling.

Figure 13:
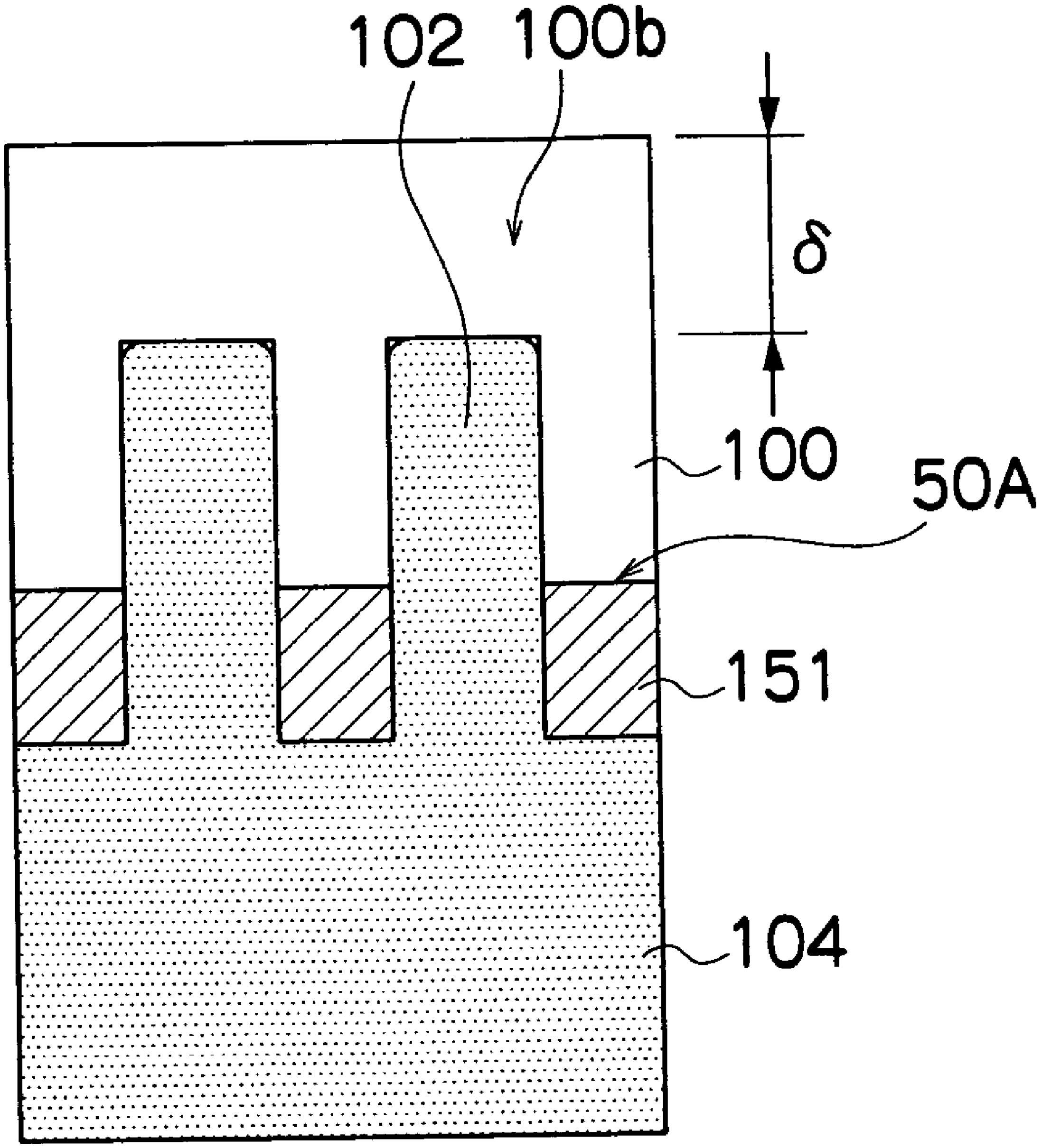
FIG. 13 is an illustrative diagram showing a method of manufacturing a nozzle plate according to a fourth embodiment.

FIG. 13 shows the state of processing of a protective sheet in the fourth embodiment.

As shown in FIG. 13, in the fourth embodiment, the holes 102 formed in the protective sheet 100 are formed to a greater depth than in the case of the first and second embodiments described above, and the thickness δ of the base portion 100*b* of each hole 102 is made sufficiently thin to allow the state of filling of the filling material 104 to be observed via the base 100*b* of the protective sheet, from above. This thickness δ depends on the material of the protective sheet 100 and the filling material 104, and the like. It is considered that the filling material 104 will be observable via the base 100*b* provided that the thickness δ is approximately 50 μm to 100 μm.

Moreover, desirably, the filling material 104 is colored in such a manner that it can be observed readily via the base 100*b*. When introducing the filling material 104, the state of filling is observed from above via the base 100*b*, and it is possible to detect when the colored filling material 104 has made contact with the inner surface of the base 100*b* of the protective sheet 100, from a change in color observed in the base 100*b* from above.

In the present embodiment, since it is possible to observe the state of filling during filling of the filling material 104, a sufficient amount of filling material can be introduced, and there is no risk of faults in the formation of the liquid-repelling film due to insufficient filling. Furthermore, since a sufficient amount of the filling material can be introduced, then in the subsequent liquid-repelling film forming step, it is possible to form the liquid-repelling film uniformly at the periphery of the nozzles.

The fourth embodiment is similar to the first and second embodiments described above in respect of the formation of holes 102 in the nozzle plate 151 and the protective sheet 100, and the remainder of the composition. After introducing the filling material 104, the protective sheet 100 is peeled away, the liquid-repelling film (not shown in the drawings) is formed on the nozzle surface 50A, and finally, the filling material 104 is removed, thereby forming the nozzle plate 151.

Next, a fifth embodiment of the present invention will be described.

In the fifth embodiment, a protective sheet is applied to a metal nozzle plate in which nozzles have already been formed, and through holes are then opened in the protective sheet, using the nozzle plate as a mask.

FIGS. 14A to 14F show a method for forming a liquid-repelling film onto a nozzle plate in the fourth embodiment.

Figure 14A:
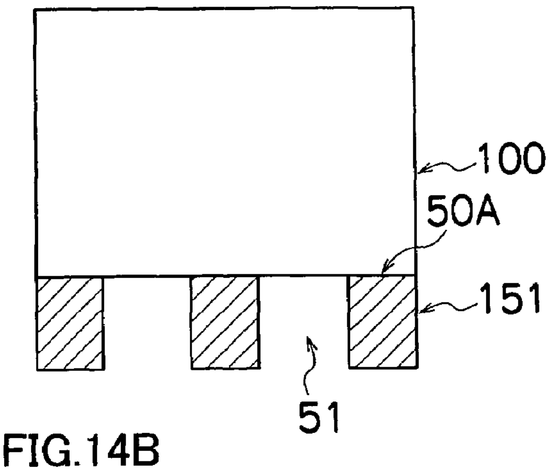
FIGS. 14A to 14F are step diagrams showing a method of manufacturing a nozzle plate according to a fifth embodiment of the invention.
Figure 14B:
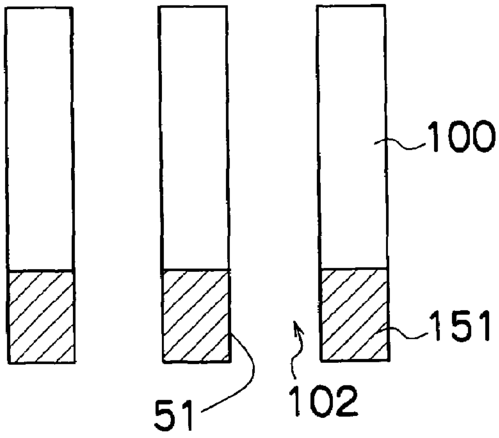
Figure 14C:
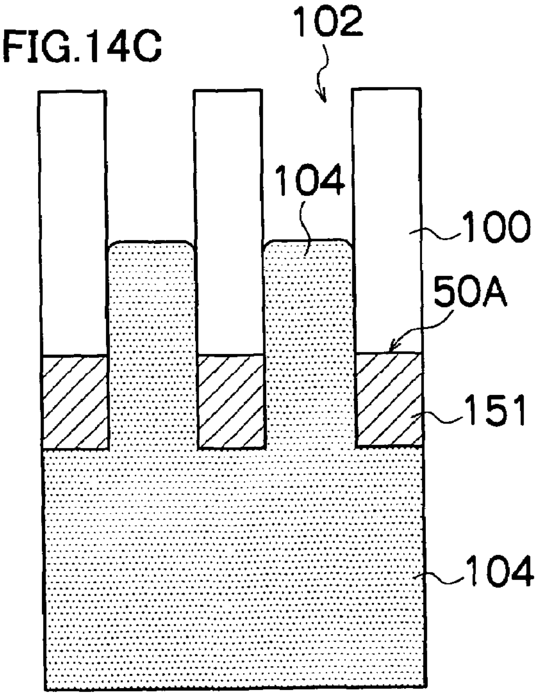
Figure 14D:
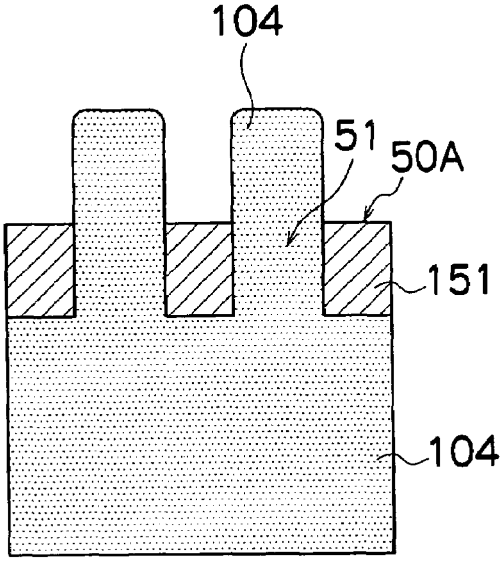
Figure 14E:
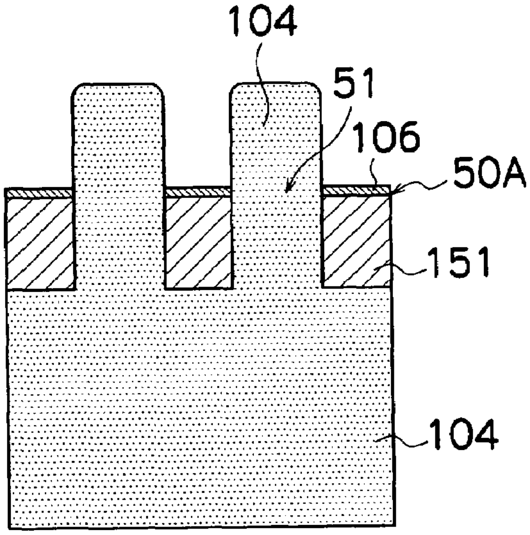
Figure 14F:
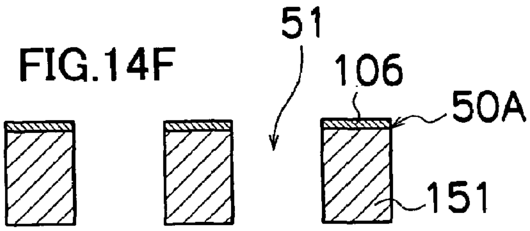

Firstly, as shown in FIG. 14A, a protective sheet 100 is applied to the nozzle surface 50A of a nozzle plate 151 in which nozzles 51 have already been formed, similarly to FIG. 10A. Thereupon, as shown in FIG. 14B, through holes 102 are opened in the protective sheet 100, using the nozzle plate 151 as a mask, similarly to FIG. 11B.

Thereafter, in the steps shown in FIG. 14C to FIG. 14F, the nozzle plate 151 is created in which the liquid-repelling film 106 is formed uniformly on the nozzle surface 50A, with the exception of the nozzles 51, similarly to the steps shown in FIG. 11C to FIG. 11F.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A method of manufacturing a nozzle plate, comprising the steps of:

applying a protective sheet to a first surface of a nozzle plate in which nozzles are to be formed, the first surface being located on an ejection surface side;

forming holes which pass through the nozzle plate and have bottoms inside the protective sheet, from a side of a second surface of the nozzle plate reverse to the first surface;

filling a filling material into the holes, from the side of the second surface until the filling material reaches a part of the protective sheet beyond the thickness of the nozzle plate;

peeling away the protective sheet after the filling step in which the filling material has been filled into the holes;

forming a liquid-repelling film on the first surface of the nozzle plate after the peeling step while the filling material projects beyond the nozzle surface, such that the filing material projects beyond the liquid-repelling film having been formed; and removing the filling material after the liquid-repelling film forming step.

2. The method as defined in claim 1, wherein:

distances between the bottoms of the holes and a surface of the protective sheet reverse to a surface applied to the nozzle plate are thin enough so as to enable observation of a filling state of the filling material during the filling step to be observed through the bottoms from a side of the surface of the protective sheet reverse to the surface applied to the nozzle plate; and the filling material is filled while the filling state is observed in the filling step.

3. The method as defined in claim 2, wherein the filling material is colored.

4. The method as defined in claim 1, wherein the holes are formed by one of dry etching and laser processing.

5. The method as defined in claim 1, further comprising the step of washing insides of the holes before the filling step.

6. The method as defined in claim 1, wherein the protective sheet loses adhesive force when heated or irradiated with light, and the protective sheet is peeled away after being made to lose its adhesive force.

7. A method of manufacturing a nozzle plate, comprising the steps of:

applying a protective sheet to a first surface of a nozzle plate in which nozzles have been formed, the first surface being located on an ejection surface side;

forming holes which are continuous with the nozzles and have bottoms inside the protective sheet, from a side of a second surface of the nozzle plate reverse to the first surface;

filling a filling material into the holes, from the side of the second surface until the filling material reaches a part of the protective sheet beyond the thickness of the nozzle plate;

peeling away the protective sheet after the filling step in which the filling material has been filled into the holes;

forming a liquid-repelling film on the first surface of the nozzle plate after the peeling step while the filling material projects beyond the nozzle surface, such that the filling material projects beyond the liquid-repelling film having been formed; and removing the filling material after the liquid-repelling film forming step.

8. The method as defined in claim 7, wherein the holes are formed by dry-etching using the nozzle plate in which nozzles have been formed as a mask.

9. The method as defined in claim 7, wherein:

distances between the bottoms of the holes and a surface of the protective sheet reverse to a surface applied to the nozzle plate are thin enough so as to enable observation of a filling state of the filling material during the filling step to be observed through the bottoms from a side of the surface of the protective sheet reverse to the surface applied to the nozzle plate; and the filling material is filled while the filling state is observed in the filling step.

10. The method as defined in claim 9, wherein the filling material is colored.

11. The method as defined in claim 7, wherein the holes are formed by one of dry etching and laser processing.

12. The method as defined in claim 7, further comprising the step of washing insides of the holes before the filling step.

13. The method as defined in claim 7, wherein the protective sheet loses adhesive force when heated or irradiated with light, and the protective sheet is peeled away after being made to lose its adhesive force.

14. A method of manufacturing a nozzle plate, comprising the steps of:

applying a protective sheet to a first surface of a nozzle plate in which nozzles are to be formed, the first surface being located on an ejection surface side;

forming holes which pass through the nozzle plate and the protective sheet, from a side of a second surface of the nozzle plate reverse to the first surface;

filling a filling material into the holes until the filling material reaches a part of the protective sheet in each of the holes, from the side of the second surface until the filling material reaches a part of the protective sheet beyond the thickness of the nozzle plate;

peeling away the protective sheet after the filling step in which the filling material has been filled into the holes;

forming a liquid-repelling film on the first surface of the nozzle plate after the peeling step while the filling material projects beyond the nozzle surface, such that the filling material projects beyond the liquid-repelling film having been formed; and removing the filling material after the liquid-repelling film forming step.

15. The method as defined in claim 14, wherein the holes are formed by one of dry etching and laser processing.

16. The method as defined in claim 14, further comprising the step of washing insides of the holes before the filling step.

17. The method as defined in claim 14, wherein the protective sheet loses adhesive force when heated or irradiated with light, and the protective sheet is peeled away after being made to lose its adhesive force.

18. A method of manufacturing a nozzle plate, comprising the steps of:

applying a protective sheet to a first surface of a nozzle plate in which nozzles have been formed, the first surface being located on an ejection surface side;

forming holes which are continuous with the nozzles and pass through the protective sheet, from a side of a second surface of the nozzle plate reverse to the first surface;

filling a filling material into the holes until the filling material reaches a part of the protective sheet in each of the holes, from the side of the second surface until the filling material reaches a part of the protective sheet beyond the thickness of the nozzle plate;

peeling away the protective sheet after the filling step in which the filling material has been filled into the holes;

forming a liquid-repelling film on the first surface of the nozzle plate after the peeling step while the filling material projects beyond the nozzle surface, such that the filling material projects beyond the liquid-repelling film having been formed; and removing the filling material after the liquid-repelling film forming step.

19. The method as defined in claim 18, wherein the holes are formed by dry-etching using the nozzle plate in which nozzles have been formed as a mask.

20. The method as defined in claim 18, wherein the holes are formed by one of dry etching and laser processing.

21. The method as defined in claim 18, further comprising the step of washing insides of the holes before the filling step.

22. The method as defined in claim 18, wherein the protective sheet loses adhesive force when heated or irradiated with light, and the protective sheet is peeled away after being made to lose its adhesive force.

* * * * *